(12) United States Patent
Bae

(10) Patent No.: US 10,763,686 B2
(45) Date of Patent: Sep. 1, 2020

(54) WIRELESS CHARGING SYSTEM AND DEVICE THEREFOR

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/079,460

(22) PCT Filed: Feb. 23, 2017

(86) PCT No.: PCT/KR2017/001968
§ 371 (c)(1),
(2) Date: Aug. 23, 2018

(87) PCT Pub. No.: WO2017/164525
PCT Pub. Date: Sep. 28, 2017

(65) Prior Publication Data
US 2019/0052116 A1    Feb. 14, 2019

(30) Foreign Application Priority Data

Mar. 22, 2016 (KR) .................. 10-2016-0034251
Apr. 5, 2016 (KR) .................. 10-2016-0041355

(51) Int. Cl.
*H02J 7/02* (2016.01)
*H02J 50/40* (2016.01)
(Continued)

(52) U.S. Cl.
CPC ............. *H02J 7/025* (2013.01); *G06F 3/039* (2013.01); *G06F 3/0354* (2013.01);
(Continued)

(58) Field of Classification Search
CPC .. H02J 5/005; H02J 7/025; H02J 17/00; H02J 50/10; H02J 50/12; H01F 5/00; H01F 5/003; H01F 2005/006
USPC ......................................... 320/108; 307/104
See application file for complete search history.

(56) References Cited

U.S. PATENT DOCUMENTS

2008/0297107 A1* 12/2008 Kato ................... H01F 27/2871
                                                                     320/108
2013/0043734 A1    2/2013 Stone et al.
(Continued)

FOREIGN PATENT DOCUMENTS

JP        2013-179820 A    9/2013
JP        2015-128142 A    7/2015
(Continued)

OTHER PUBLICATIONS

European Search Report (Application No. 17770496.2) dated Sep. 17, 2019.

*Primary Examiner* — David V Henze-Gongola
(74) *Attorney, Agent, or Firm* — Birch, Stewart, Kolasch & Birch, LLP

(57) ABSTRACT

The present invention relates to a wireless charging system using a wireless charging system, and a device therefor. A wireless power receiving device according to one embodiment of the present invention may comprise: first to $N^{th}$ receiving coils disposed to be partially overlapped on the same plane so as to receive wireless power signals; first to $N^{th}$ output terminals formed to enable both ends of each of the first to $N^{th}$ receiving coils to be connected thereto so as to transfer alternating current power induced by at least any one among the first to $N^{th}$ receiving coils; and a rectifier for converting, into direct current power, the alternating current power to be input from the first to $N^{th}$ output terminals. Therefore, the present invention has an advantage of minimizing charging interruptions and minimizing manufacturing costs of a wireless power transmitting device.

17 Claims, 31 Drawing Sheets

(51) Int. Cl.
*H02J 50/90* (2016.01)
*H02J 50/10* (2016.01)
*G06F 3/039* (2013.01)
*H02J 7/00* (2006.01)
*H02J 50/70* (2016.01)
*G06F 3/0354* (2013.01)
*H02J 50/12* (2016.01)
*H01F 27/40* (2006.01)
*H01F 27/28* (2006.01)
*H01F 38/14* (2006.01)
*H01Q 1/24* (2006.01)

(52) U.S. Cl.
CPC .............. *H02J 7/0042* (2013.01); *H02J 7/02* (2013.01); *H02J 50/10* (2016.02); *H02J 50/12* (2016.02); *H02J 50/40* (2016.02); *H02J 50/70* (2016.02); *H02J 50/90* (2016.02); *H01F 27/2804* (2013.01); *H01F 38/14* (2013.01); *H01F 2027/408* (2013.01); *H01Q 1/248* (2013.01); *H02J 7/0044* (2013.01)

(56) References Cited

U.S. PATENT DOCUMENTS

| | | | | |
|---|---|---|---|---|
| 2013/0207480 A1* | 8/2013 | Sheng | ............... | H02J 5/005 |
| | | | | 307/104 |
| 2015/0145632 A1 | 5/2015 | Fukuzawa et al. | | |
| 2015/0188354 A1 | 7/2015 | Sun et al. | | |
| 2015/0236513 A1* | 8/2015 | Covic | ............... | H02J 7/025 |
| | | | | 307/104 |

FOREIGN PATENT DOCUMENTS

| | | | |
|---|---|---|---|
| KR | 10-2013-0119585 A | | 11/2013 |
| KR | 10-2014-0065411 A | | 5/2014 |
| KR | 10-2014-0129172 A | | 11/2014 |
| WO | WO-2013122483 A1 | * | 8/2013 |
| WO | WO 2015/125295 A1 | | 8/2015 |
| WO | WO 2015/137431 A1 | | 9/2015 |
| WO | WO 2015/153293 A1 | | 10/2015 |

\* cited by examiner

WIRELESS CHARGING SYSTEM AND DEVICE THEREFOR

CROSS REFERENCE TO RELATED APPLICATIONS

This application is the National Phase of PCT International Application No. PCT/KR2017/001968, filed on Feb. 23, 2017, which claims priority under 35 U.S.C. 119(a) to Patent Application Nos. 10-2016-0034251, filed in the Republic of Korea on Mar. 22, 2016 and 10-2016-0041355, filed in the Republic of Korea on Apr. 5, 2016, all of which are hereby expressly incorporated by reference into the present application.

TECHNICAL FIELD

The present invention relates to wireless charging technology, and more particularly, to a wireless charging system capable of maximizing a charging-capable area on a charge bed by removing a charging deadzone and devices therefor.

BACKGROUND ART

Recently, with the rapid development of information and communication technology, a ubiquitous society is arising based on information and communication technology.

In order for information and communication devices to be connected anytime and anywhere, sensors equipped with a computer chip having a communication function need to be installed in all facilities in society. Therefore, the problem of supplying power to these devices and sensors is a new challenge. In addition, as a variety of portable devices, such as music players, including Bluetooth headsets and iPods, as well as mobile phones, has been rapidly increasing, charging batteries has come to require greater time and effort on the part of users. As a way to solve this problem, a wireless power transmission technology has recently attracted attention.

Wireless power transmission (wireless energy transfer) technology is a technology for wirelessly transmitting electrical energy from a transmitter to a receiver using an electromagnetic induction principle. An electric motor or a transformer that uses such an electromagnetic induction principle was already in use in the 1800s, and thereafter, a method of transferring electrical energy by radiating electromagnetic waves, such as radio waves, a laser, high-frequency waves, and microwaves, has also been attempted. Electric toothbrushes and some wireless shavers that are often used are also actually charged with the electromagnetic induction principle.

Wireless energy transfer schemes devised to date may be broadly classified into an electromagnetic induction scheme, an electromagnetic resonance scheme, and an RF transmission scheme using a short wavelength radio frequency.

The electromagnetic induction scheme is a technology that uses a phenomenon in which a magnetic flux, which is generated when two coils are disposed adjacent to each other and current is applied to one coil, causes the other coil to generate an electromotive force. This technology is being rapidly commercialized around small devices such as mobile phones. The magnetic induction scheme enables the transmission of up to several hundred kilowatts (kW) of power and has high efficiency, but the maximum transmission distance thereof is 1 centimeter (cm) or less, and therefore an object to be charged needs to be disposed adjacent to a charger.

The electromagnetic resonance scheme is characterized in that it uses an electric field or a magnetic field, instead of utilizing electromagnetic waves, currents, or the like. The electromagnetic resonance scheme is advantageously safe to other electronic devices and the human body since it is hardly influenced by electromagnetic waves, which may be problematic. However, the electromagnetic resonance scheme is available only at a limited distance and space, and the energy transfer efficiency thereof is somewhat low.

The short wavelength wireless power transmission scheme, simply put, the RF transmission scheme utilizes the fact that energy may be transmitted and received directly in radio-wave form. This technology is an RF wireless power transmission scheme using a rectenna. The term "rectenna" is a portmanteau of "antenna" and "rectifier", and refers to a device that directly converts RF power into DC power. In other words, the RF scheme is a technology for converting AC radio waves into DC power, and research on commercialization of the RF scheme has been actively conducted as the efficiency thereof has been improved recently.

The wireless power transmission technology may be applied not only to the mobile industry, but also to various other industries such as the IT, railroad, and home appliance industries.

Generally, the direction of an electromagnetic field is reversed between the inside and the outside of the turns of a closed-loop transmission coil, so that there is a charging shadow area near the turns of the closed-loop transmission coil.

When a reception coil of a wireless power reception device is located in the charging shadow area, wireless charging may not be performed normally.

Therefore, conventionally, an attempt has been made to minimize the charging shadow area by disposing the closed-loop transmission coil in the outermost portion of a charge bed.

However, in a wireless charging system to which the above-described conventional method is applied, a charging-capable area formed outside the closed-loop transmission coil may not be used, and it is necessary for a wireless power transmission device to use a shielding material having a size corresponding to the area of the closed-loop transmission coil.

In addition, in the conventional wireless charging system, since the closed-loop transmission coil is disposed in the outermost portion of the charge bed, the length of the used transmission coil may increase, which is problematic.

Hereinafter, a wireless power device having a plurality of transmission coils according to the related art will be described with reference to FIGS. 1a to 1d.

Reference characters (a) and (b) of FIG. 1a illustrate a wireless power transmitter and a wireless power receiver of the related art. Referring to reference character (a) of FIG. 1a, the wireless power transmitter 11 incorporates therein a transmission coil 13 for wireless power transmission. The wireless power transmitter 11 transmits wireless power to the wireless power receiver 15 via the transmission coil 13. The wireless power transmitter may transmit power to the wireless power receiver 15 through an electromagnetic resonance scheme. Reference character (b) of FIG. 1a illustrates a side view of the wireless power transmitter 11 and the wireless power receiver 15. The wireless power receiver 15 may be spaced apart from the wireless power transmitter 11 by a distance sufficient to receive wireless power through an electromagnetic resonance scheme.

FIG. 1b is a view for explaining a charging-capable area of the transmission coil 13 described above. The transmission coil 13 may be disposed in an outer peripheral portion of the wireless power transmitter 11. The charging-capable area includes a first area 21 and a second area 25. The first area 21 is located outside the transmission coil 13, and the second area 25 is located inside the transmission coil 13. The terms "outside" and "inside" are defined on the basis of the transmission coil.

Here, a non-charging area may include a third area 23 and a fourth area 27. The third area 23 is a non-charging area in which matching of the impedances of the transmission coil 13 and a reception coil (not illustrated) is difficult. The third area 23 includes an outer non-charging area outside the transmission coil 13 and an inner non-charging area inside the transmission coil 13. The fourth area 27, which is a central area inside the transmission coil 13, has very low magnetic coupling capability with the reception coil, and thus has very low power transmission efficiency.

In order to overcome the limits of FIG. 1b, in the related art, the transmission coil 13 may be disposed, as illustrated in FIG. 1c. The transmission coil 13 is configured as one, but forms two rings. These rings may include an inner ring and an outer ring surrounding the outer periphery of the inner ring. The transmission coil 13 provides an improved inner ring area 33 instead of the fourth area 27 as the non-charging area, but a non-charging area 31 may also be generated in the inner ring area. Thus, charging may be interrupted and inconvenience in use may occur.

In order to overcome the problem of FIG. 1c, in the related art, a second transmission coil 41, which is separate from the first transmission coil 13, is disposed in a charging-capable area of the first transmission coil 13, as illustrated in FIG. 1d. Here, the second transmission coil forms an inner ring and the first transmission coil 13 forms an outer ring. The transmitter alternately applies current to the first transmission coil 13 and the second transmission coil 41 to realize a continuous charge area. However, in the case of FIG. 1d, the magnetic coupling between the first transmission coil 13 and the second transmission coil is very high, thus causing large power loss. This is because the second transmission coil 41 is disposed in the area in which a magnetic field is generated by the first transmission coil 13.

Therefore, there is a demand for the introduction of a more advanced wireless power transmission device.

Technical Object

The present invention has been devised to overcome the problems of the related art described above, and it is one object of the present invention to provide a wireless charging system and a device therefor.

It is another object of the present invention to provide a wireless charging system capable of removing a charging shadow area and a device therefor.

It is another object of the present invention to provide a wireless charging system capable of maximizing a charging-capable area and a device therefor.

It is another object of the present invention to provide a wireless charging system capable of removing a charging shadow area by mounting a wireless power reception pad, having a minimum coupling coefficient value between reception coils, in a wireless power reception device and a device therefor.

It is another object of the present invention to provide a wireless power transmitter having a plurality of transmission coils for increasing charging efficiency for a wireless power receiver and a driving method thereof.

It is another object of the present invention to provide a wireless power transmitter having a plurality of transmission coils for changing a charging shadow area into a charging-capable area and a driving method thereof.

It is a further object of the present invention to provide a wireless power transmitter enabling wireless charging when wireless charging is not performed due to misalignment of a wireless power receiver and a driving method thereof.

The technical objects to be accomplished by the present invention are not limited to the aforementioned technical objects, and other unmentioned technical objects will be clearly understood from the following description by those having ordinary skill in the art.

Technical Solution

The present invention may provide a wireless charging system using a wireless charging system and devices therefor.

A wireless power reception device according to an embodiment of the present invention includes first to $N^{th}$ reception coils disposed such that partial regions thereof overlap each other in the same plane for receiving a wireless power signal, first to $N^{th}$ output terminals connected to both ends of each of the first to $N^{th}$ reception coils for transferring alternating current power induced by at least one of the first to $N^{th}$ reception coils, and a rectifier configured to convert the alternating current power, input from the first to $N^{th}$ output terminals, into direct current power.

Each overlapping region may have a size determined such that a coupling coefficient between any two reception coils, among the first to $N^{th}$ reception coils, is zero or a value equal to or less than a predetermined reference value.

The first to $N^{th}$ reception coils may be disposed such that the turns of the first to $N^{th}$ reception coils mutually form rings.

Each of the first to $N^{th}$ reception coils may have a fan shape.

The first to $N^{th}$ reception coils overlapping each other in the partial regions thereof may have a circular overall outer shape.

An interior angle of the fan shape may have a value obtained by dividing 360 degrees by N.

The first to $N^{th}$ reception coils may be disposed such that the turns of the fan-shaped reception coils are parallel to each other in a linear section thereof.

"N" is equal to or greater than 3.

The first to $N^{th}$ reception coils may be disposed such that areas of overlapping regions between any two reception coils, among the first to $N^{th}$ reception coils, are the same.

The rectifier may be provided for each output terminal.

The wireless power signal may be an alternating current power signal modulated with a predetermined resonance frequency and received wirelessly.

The wireless power reception device may further include a temperature sensor for measuring a temperature at one side inside the turns of at least one of the first to $N^{th}$ reception coils.

A wireless power transmission pad according to another embodiment of the present invention includes a charge bed, on which a wireless power reception device is disposed, the charge bed having a planar shape, a transmission coil mounted in a closed-loop form below the charge bed so as to be spaced apart inward from an outermost peripheral portion of the charge bed by a predetermined distance, and a shielding material mounted below the transmission coil so as to cover an inner area of the closed loop.

Here, the predetermined distance may be set to a minimum value at which a charging-capable area formed around the closed loop is wholly included in the charge bed.

The charging-capable area formed around the closed loop may be determined based on the intensity of maximum power to be transmitted via the transmission coil or a class of a wireless power transmission device on which the wireless power transmission pad is mounted.

An area of the shielding material may be equal to or greater than the inner area of the closed loop and less than an area of the charge bed.

The charging-capable area may include an area, in which the wireless power reception device is to be disposed on the charge bed, excluding the inner region of the closed loop.

The wireless power transmission pad may be mounted on a wireless power transmission device that transmits wireless power in an electromagnetic resonance scheme.

A wireless charging system according to still another embodiment of the present invention includes a wireless power reception device including first to $N^{th}$ reception coils disposed such that partial regions thereof overlap each other in the same plane in order to receive an electromagnetic signal, first to $N^{th}$ output terminals connected to both ends of each of the first to $N^{th}$ reception coils to transfer alternating current power induced by at least one of the first to $N^{th}$ reception coils, and a rectifier configured to convert the alternating current power, input from the first to $N^{th}$ output terminals, into direct current power, and a wireless power transmission device including a charge bed, on which the wireless power reception device is disposed, the charge bed having a planar shape, a transmission coil mounted in a closed-loop form below the charge bed so as to be spaced apart inward from an outermost peripheral portion of the charge bed by a predetermined distance, and a shielding material mounted below the transmission coil so as to cover an inner area of the closed loop.

Here, a charging shadow area may be present near the turns forming the closed loop, and the first to $N^{th}$ reception coils may be disposed in the wireless power reception device such that at least one reception coil of the first to $N^{th}$ reception coils is not located in the charging shadow area.

The overlapping region may have a size determined such that a coupling coefficient between any two reception coils, among the first to $N^{th}$ reception coils, is zero or a value equal to or less than a predetermined reference value.

The wireless power transmission device may transmit wireless power to the wireless power reception device through an electromagnetic resonance scheme.

A wireless power transmitter including a plurality of transmission coils is provided according to a further embodiment of the present invention.

The wireless power transmitter may include the plurality of transmission coils arranged side by side at a predetermined distance to form an upper loop and a lower loop; and a controller configured to perform control to transmit wireless power via the plurality of transmission coils. Each set of a first transmission coil and a second transmission coil adjacent to each other, among the plurality of transmission coils, may be disposed such that a charging area, formed by the lower loop of the first transmission coil, of an area outside the first transmission coil overlaps a charging shadow area due to the upper loop of the second transmission coil.

The wireless power transmitter may include first to $N^{th}$ transmission coils disposed at a predetermined distance to enable wireless power transmission so that the wireless power receiver is charged even if the wireless power receiver is disposed in an area between adjacent transmission coils; and a controller configured to perform control to transmit wireless power to the wireless power receiver via the first to $N^{th}$ transmission coils when the wireless power receiver is detected.

It is to be understood that the forging aspects of the present invention are only some exemplary embodiments of the present invention and that various embodiments that incorporate technical features of the present invention will be derived and understood based on the following detailed description of the present invention by those having ordinary skill in the art.

Advantageous Effects

The effects of a method and a device according to the present invention will be described as follows.

The present invention has an advantage of providing a wireless charging system and a device therefor.

The present invention further has an advantage of effectively reducing manufacturing costs of a wireless power transmission device by minimizing the area of a charge bed to which a shielding material and a transmission coil are applied.

The present invention further has an advantage of providing a wireless charging system, which maximizes a charging-capable area through the use of a charging-capable area around a closed-loop transmission coil, and a device therefor.

The present invention has an advantage of providing a wireless charging system, which is capable of removing a charging shadow area by mounting a wireless power reception pad, having a minimum coupling coefficient value between reception coils, in a wireless power reception device, and a device therefor.

The present invention has an advantage of providing a wireless power device having a plurality of transmission coils and a driving method thereof.

According to the present invention, charging efficiency for a wireless power receiver may be increased, which may improve charging efficiency and user convenience.

According to the present invention, the charging shadow area may be eliminated, which may improve charging efficiency and user convenience.

According to the present invention, wireless charging is possible even when wireless charging is not performed due to misalignment of the wireless power receiver, which may improve user convenience.

The effects to be accomplished by the present invention are not limited to the aforementioned effects, and other unmentioned effects will be clearly understood from the following description by those having ordinary skill in the art.

DESCRIPTION OF DRAWINGS

The accompanying drawings are included to provide a further understanding of the invention, and illustrate the embodiments of the present invention together with the following detailed description. It is to be understood, however, that the technical features of the present invention are not limited to the specific drawings, and the features disclosed in the respective drawings may be combined with each other to constitute a new embodiment.

BEST MODE

Figure 1A:
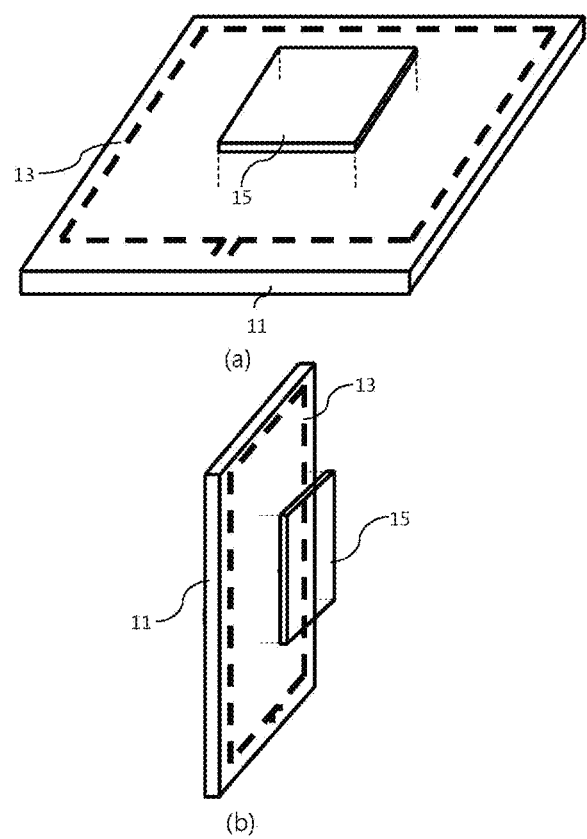
FIGS. 1a to 1d are views illustrating a conventional wireless power transmission device.
Figure 1B:
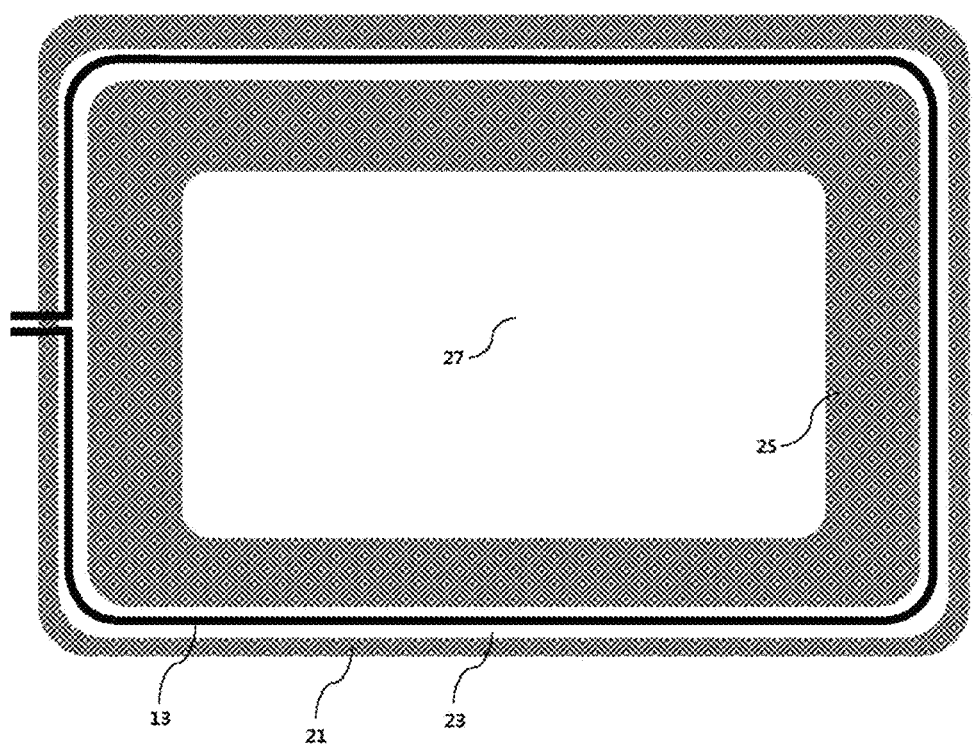
Figure 1C:
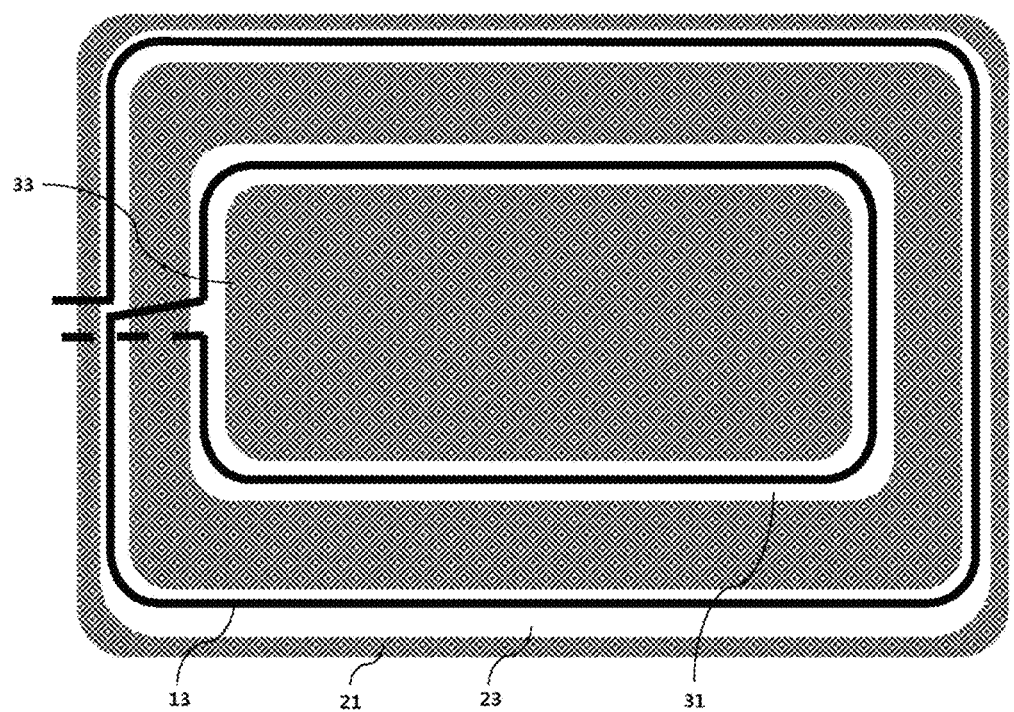
Figure 1D:
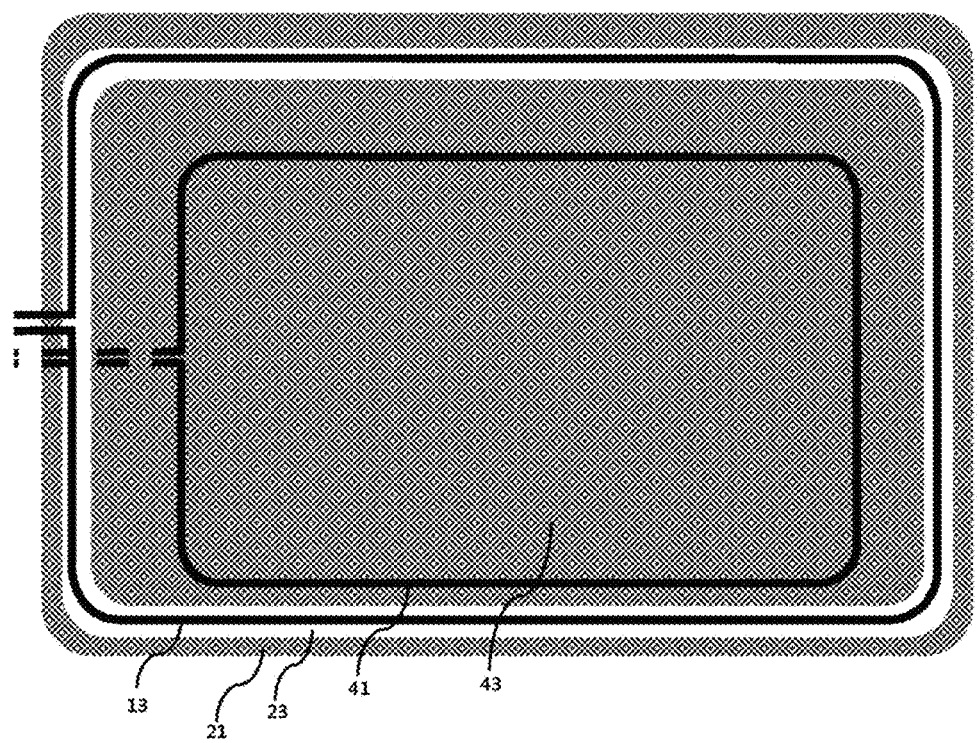

According to an embodiment of the present invention, a wireless power reception device may include first to $N^{th}$ reception coils disposed such that partial regions thereof overlap each other in the same plane for receiving a wireless power signal, first to $N^{th}$ output terminals connected to both ends of each of the first to $N^{th}$ reception coils for transferring alternating current power induced by at least one of the first to $N^{th}$ reception coils, and a rectifier configured to convert the alternating current power, input from the first to $N^{th}$ output terminals, into direct current power.

MODE FOR INVENTION

Hereinafter, devices and various methods, to which the embodiments of the present invention are applied, will be described in more detail with reference to the accompanying drawings. With respect to constituent elements used in the following description, suffixes "module" and "unit" are given or mingled with each other only in consideration of ease in the preparation of the specification, and do not have or serve as different meanings.

While all constituent elements of the embodiments of the present invention have been described as being coupled to each other into one or as being operated in connection with each other, the present invention is not limited to these embodiments. That is, one or more of all of the elements may be selectively coupled and operated without exceeding the scope of the present invention. In addition, each of all constituent elements may be realized as independent hardware, but some or all of the constituent elements may be selectively combined and realized as a computer program having a program module, which performs some or all of functions combined in one piece or a plurality of pieces of hardware. Codes and code segments constituting the computer program may be easily derived by those skilled in the art. The computer program may be stored in a computer readable storage medium so as to be read and executed by a computer, thereby realizing the embodiments of the present invention. Examples of the storage medium of the computer program may include a magnetic recording medium, an optical recording medium, and a carrier-wave medium.

In the description of the embodiments, it will be understood that, when an element is referred to as being formed "on" or "under" and "in front of" or "at the rear of" another element, it may be directly "on" or "under" and "in front of" or "at the rear of" the other element or be indirectly formed with intervening elements therebetween.

In addition, the terms "includes" "constitutes" and/or "has", when used in this specification, specify the presence of stated elements, but do not preclude the presence or addition of other elements. Unless otherwise defined, all terms (including technical and scientific terms) used herein have the same meaning as commonly understood by one of ordinary skill in the art to which the embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

In addition, in the description of constituent elements of the present invention, the terms "first", "second", "A", "B", "(a)", "(b)", and the like will be used. These terms are used for distinguishing between similar elements and not necessarily for describing a particular sequential or chronological order. It will be understood that when any element is referred to as being "connected to," "coupled to", or "joined to" another element, it may be directly on, connected to or coupled to the other element or intervening elements may be present.

In the description of the embodiments, "wireless power transmitter," "wireless power transmission device," "transmission terminal," "transmitter," "transmission device," "transmission side," and the like will be interchangeably used to refer to a device that transmits wireless power in a wireless power system, for the convenience of description.

In addition, "wireless power reception device," "wireless power receiver," "reception terminal," "reception side," "reception device," "receiver," and the like will be interchangeably used to refer to a device that receives wireless power from a wireless power transmission device, for the convenience of description.

A wireless power transmitter according to the present invention may be configured as a pad type, a cradle type, an access point (AP) type, a small base station type, a stand type, a ceiling embedded type, a wall-mounted type, a vehicle-embedded type, a vehicle cradle type, or the like. One wireless power transmitter may transmit power to a plurality of wireless power receivers at the same time or in a time sharing manner.

In particular, a wireless power transmitter according to the present invention may be configured as a mouse pad for the charging of a wireless mouse.

To this end, the wireless power transmitter may include at least one wireless power transmission unit.

In addition, a wireless power transmitter according to the present invention may be connected to and linked with another wireless power transmitter through a network. In one example, the wireless power transmitters may be linked with each other using near field wireless communication such as Bluetooth. In another example, the wireless power transmitters may be linked with each other using wireless communication technology such as Wideband Code Division Multiple Access (WCDMA) communication, Long Term Evolution (LTE)/LTE-Advance communication, or Wi-Fi communication.

A wireless power transmission unit according to the present invention may use various wireless power transmission standards based on an electromagnetic induction scheme for charging power using an electromagnetic induction principle in which a magnetic field is generated in a power transmission terminal coil and electricity is induced in a reception terminal coil by the influence of the magnetic field. Here, the wireless power transmission unit may adopt an electromagnetic induction type wireless charging technique defined in a Wireless Power Consortium (WPC) or a Power Matters Alliance (PMA), which is a wireless charging technology standard organization.

In another example, a wireless power transmission unit may use an electromagnetic resonance scheme in which a magnetic field generated by a transmission coil of a wireless power transmitter is tuned to a specific resonance frequency to transmit power to a wireless power receiver that is located nearby. For example, the electromagnetic resonance scheme may include resonance-type wireless charging technology defined by the alliance for wireless power (A4WP), which is a wireless charging technology standard organization.

In still another example, a wireless power transmission unit may use an RF wireless power transmission scheme in which low power energy is loaded to an RF signal so that power is transmitted to a wireless power receiver that is located at a remote location.

In a further example of the present invention, a wireless power transmitter according to the present invention may be designed to support at least two wireless power transmission schemes among the electromagnetic induction scheme, the electromagnetic resonance scheme, and the RF wireless power transmission scheme.

In this case, the wireless power transmitter may transmit power in a wireless power transmission scheme that a connected wireless power receiver supports. In one example, when the wireless power receiver supports multiple wireless power transmission schemes, the wireless power transmitter may select an optimal wireless power transmission scheme for the wireless power receiver and transmit power in the selected wireless power transmission scheme. In another example, the wireless power transmitter may adaptively determine a wireless power transmission scheme for use in the wireless power receiver based on the type of the wireless power receiver, the power reception state, the required power, and the like.

In addition, a wireless power receiver according to an embodiment of the present invention may include at least one wireless power reception unit, and may receive wireless power from two or more wireless power transmitters at the same time. Here, the wireless power reception unit may include at least one of the electromagnetic induction scheme, the electromagnetic resonance scheme, or the RF wireless power transmission scheme.

In addition, a wireless power receiver according to another embodiment of the present invention may select an optimal wireless power reception unit and receive power based on, for example, reception sensitivity or power transmission efficiency measured for each wireless power reception unit.

A wireless power receiver according to the present invention may be embedded in small electronic devices, such as a mobile phone, a smartphone, a laptop computer, a digital broadcast terminal, a personal digital assistant (PDA), a portable multimedia player (PMP), a navigation system, an MP3 player, an electric toothbrush, an electronic tag, a lighting device, a remote controller, and a fishing float, without being limited thereto, and may be applied to any devices that may be provided with a wireless power reception unit according to the present invention and may be charged via a battery. A wireless power receiver according to another embodiment of the present invention may be mounted in a home appliance such as a TV, a refrigerator, or a washing machine, a vehicle, an unmanned aerial vehicle, an air drone, a robot, and the like.

In particular, a wireless power receiver according to the present invention may be equipped with a multi-reception coil, and may be mounted in one side of a wireless mouse.

Hereinafter, a wireless charging system and a wireless power transmission device and a wireless power reception device therefor according to an embodiment of the present invention in the case in which a wireless charging scheme is an electromagnetic resonance scheme will be described in detail by way of example.

Figure 1E:
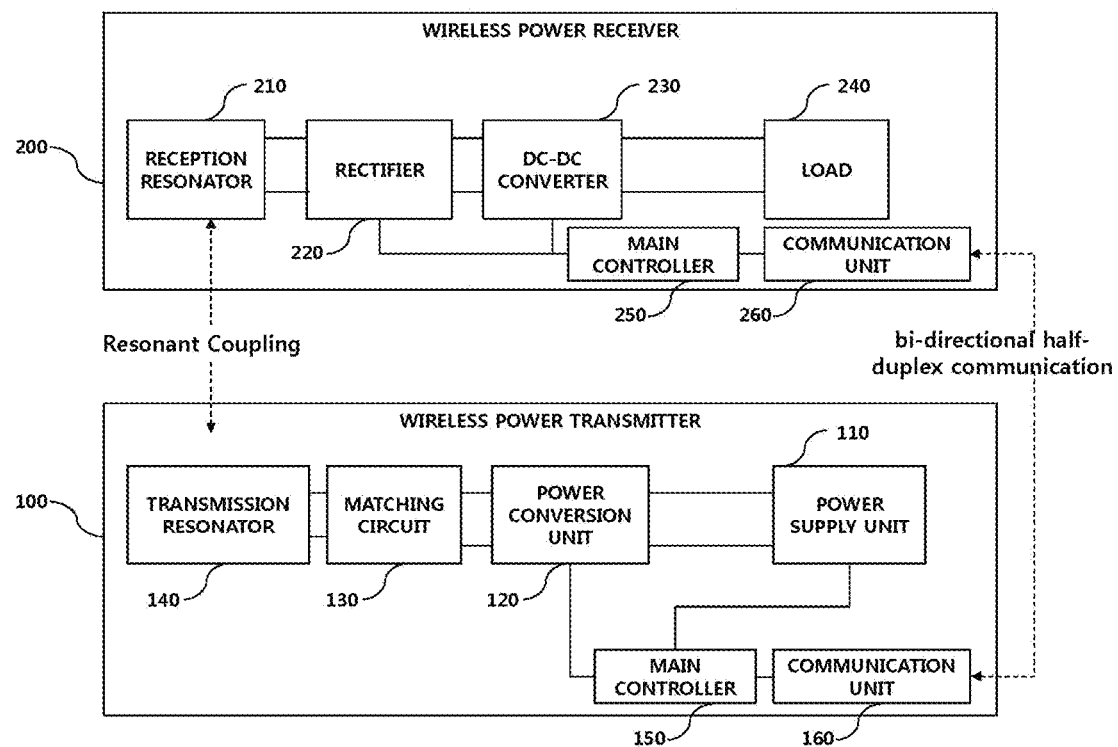
FIG. 1e is a block diagram for explaining the structure of a wireless power transmission system according to an embodiment of the present invention.

FIG. 1e is a block diagram for explaining the structure of a wireless charging system according to an embodiment of the present invention.

Referring to FIG. 1e, the wireless charging system may include a wireless power transmitter 100 and a wireless power receiver 200.

Although FIG. 1e illustrates that the wireless power transmitter 100 transmits wireless power to one wireless power receiver 200, this is merely one embodiment, and the wireless power transmitter 100 according to another embodiment of the present invention may transmit wireless power to a plurality of wireless power receivers 200. It is to be noted that the wireless power receiver 200 according to a further embodiment may receive wireless power from a plurality of wireless power transmitters 100 at the same time.

The wireless power transmitter 100 may generate an alternating current power signal using a specific resonance frequency to transmit power to the wireless power receiver 200.

The wireless power receiver 200 may receive the alternating current power signal by tuning to the same frequency as the resonance frequency used by the wireless power transmitter 100. That is, the wireless power receiver 200 may wirelessly receive power transmitted by the wireless power transmitter 100 through a resonance phenomenon.

For example, the resonance frequency used for wireless power transmission may be 6.78 MHz, without being limited thereto.

Here, the power transmitted by the wireless power transmitter 100 may be transferred only to the wireless power receiver 200, which is resonantly coupled with the wireless power transmitter 100.

The maximum number of wireless power receivers 200 that may receive power from one wireless power transmitter 100 may be determined by the maximum power transmission level of the wireless power transmitter 100, the maximum power reception level of the wireless power receiver 200, and the physical structure of the wireless power transmitter 100 and the wireless power receiver 200.

The wireless power transmitter 100 and the wireless power receiver 200 may perform bidirectional communication in a frequency band different from the frequency band for wireless power transmission, i.e., the resonance frequency band. For example, bi-directional communication may use a half-duplex Bluetooth Low Energy (BLE) communication protocol, without being limited thereto.

The wireless power transmitter 100 and the wireless power receiver 200 may mutually exchange characteristic and state information, i.e., power negotiation information, through bidirectional communication.

For example, the wireless power receiver 200 may transmit certain power reception state information for controlling the level of power received from the wireless power transmitter 100 to the wireless power transmitter 100 through bidirectional communication, and the wireless power transmitter 100 may dynamically control the transmission power level based on the received power reception state information. Thereby, the wireless power transmitter 100 may not only optimize power transmission efficiency but may also provide a function of preventing a load breakage due to overvoltage or a function of preventing unnecessary power consumption due to undervoltage, for example.

In addition, the wireless power transmitter 100 may perform, for example, a function of authenticating and identifying the wireless power receiver 200, a function of identifying incompatible devices or non-charging objects, or a function of identifying a valid load through bidirectional communication.

In addition, the wireless power transmitter 100 may obtain information about the power consumption of an electronic device mounted in the wireless power receiver 200 from the corresponding wireless power receiver 200 through bidirectional communication.

In addition, the wireless power transmitter 100 may obtain information about the maximum charge capacity and a change in the charge of the load connected to the wireless power receiver 200 through bidirectional communication.

In addition, the wireless power transmitter 100 may transmit output power intensity information to the wireless power receiver 200 from a transmission terminal thereof through bidirectional communication. In this case, the wireless power receiver 200 may measure the intensity of power applied to the load during charging, and may calculate wireless charging efficiency using the intensity of power output from the transmission terminal and the intensity of the power applied to the load. The calculated wireless charging efficiency may be transmitted to the wireless power transmitter 100 through bidirectional communication.

Hereinafter, a resonance type wireless power transmission process will be described in more detail with reference to FIG. 1e.

The wireless power transmitter 100 may include a power supply unit 110, a power conversion unit 120, a matching circuit 130, a transmission resonator 140, a main controller 150, and a communication unit 160. The communication unit may include a data transmitter and a data receiver.

The power supply unit 110 may supply a specific supply voltage to the power conversion unit 120 under the control of the main controller 150. Here, the supply voltage may be a DC voltage or an AC voltage.

The power conversion unit 120 may convert the voltage received from the power supply unit 110 into a specific voltage under the control of the main controller 150. To this end, the power conversion unit 120 may include at least one of a DC/DC converter, an AC/DC converter, or a power amplifier.

The matching circuit 130 is a circuit that matches impedances between the power conversion unit 120 and the transmission resonator 140 in order to maximize power transmission efficiency.

The transmission resonator 140 may wirelessly transmit power using a specific resonance frequency according to the voltage applied from the matching circuit 130.

The wireless power receiver 200 may include a reception resonator 210, a rectifier 220, a DC-DC converter 230, a load 240, a main controller 250, and a communication unit 260. The communication unit may include a data transmitter and a data receiver.

The reception resonator 210 may receive the power transmitted by the transmission resonator 140 through a resonance phenomenon.

The rectifier 220 may perform a function of converting an AC voltage applied from the reception resonator 210 into a DC voltage.

The DC-DC converter 230 may convert the rectified DC voltage into a specific DC voltage required by the load 240.

The main controller 250 may control the operation of the rectifier 220 and the DC-DC converter 230, or may generate the characteristic and state information of the wireless power receiver 200 and control the communication unit 260 to transmit the characteristic and state information of the wireless power receiver 200 to the wireless power transmitter 100. For example, the main controller 250 may control the operation of the rectifier 220 and the DC-DC converter 230 by monitoring the intensity of the voltage and current output from the rectifier 220 and the DC-DC converter 230.

The monitored output voltage and current intensity information may be transmitted to the wireless power transmitter 100 via the communication unit 260.

In addition, the main controller 250 may compare the rectified DC voltage with a predetermined reference voltage to determine whether the voltage is in an overvoltage state or in an undervoltage state, and when a system error state is detected according to the determination result, may transmit the detection result to the wireless power transmitter 100 via the communication unit 260.

In addition, when a system error state is detected, the main controller 250 may control the operation of the rectifier 220 and the DC-DC converter 230 in order to prevent damage to the load, or may control the power to be applied to the load 240 using a predetermined overcurrent cutoff circuit including a switch and/or a Zener diode.

In addition, when a predetermined timer, which is driven for external or internal message handling, expires, the main controller 250 may determine a local fault state and may transmit a predetermined fault notification message to the wireless power transmitter 100 via the communication unit 260.

It is to be noted that the main controller 150 or 250 and the communication unit 160 or 260 of each of the transmitter and the receiver are configured as mutually different modules in FIG. 1, but this is merely one embodiment, and in another embodiment of the present invention, the main controller 150 or 250 and the communication unit 160 or 260 may be configured as a single module.

The main controller 250 of the wireless power receiver 200 according to the present invention may calculate the estimated time required until charging of the load 240 is completed based on the maximum charge capacity of the load 240 and the current charge state of the load 240 (i.e. including information about the current charge rate with respect to the maximum charge capacity and the amount of power currently charged in the load 240). The wireless power receiver 200 may transmit the calculated estimated charge completion time to a microprocessor (not illustrated) of an electronic device (e.g., a smart phone) connected thereto via a predetermined interface. Subsequently, the microprocessor may display the estimated charge completion time via a display unit provided in the electronic device. It is to be noted that the main controller 250 for controlling the operation of the wireless power receiver 200 and the microprocessor mounted in the electronic device are described as separate hardware devices by way of example, but this is merely one embodiment, and the main controller 250 and the microprocessor may be mounted in one hardware device and configured as separate software modules. In addition, the wireless power receiver 200 may transmit the calculated estimated charge completion time to the wireless power transmitter 100 through bidirectional communication.

In addition, the wireless power receiver 200 according to the present invention may detect a change in the operating state of the connected electronic device and recalculate the estimated time required until completion of charging. For example, the change in the operating state of the electronic device may include at least one of power ON/OFF switching of the electronic device, a change in the execution state of an application in the electronic device, power ON/OFF switching of the electronic device display, or a change in the amount of power consumed by the electronic device. That is, the wireless power receiver 200 may adaptively calculate or measure the amount of power consumed by the electronic device in real time according to the change in the operating state of the electronic device, and may recalculate the estimated time required until completion of charging based on the calculated or measured amount of consumed power. Of course, the recalculated estimated charge completion time may be displayed via the display unit of the electronic device, and may also be transmitted to the wireless power transmitter 100 through bidirectional communication.

In addition, when an event, such as addition of a new wireless power receiver to a charging area while the existing wireless power receiver is being charged, disconnection of the wireless power receiver that is being charged, or completion of charging of the wireless power receiver, is detected, the wireless power transmitter 100 according to the present invention may perform a power redistribution procedure for the remaining wireless power receivers to be charged. At this time, the power redistribution result may be transmitted to the connected wireless power receiver(s) through out-of-band communication. The wireless power receiver 200 may recalculate the estimated charge completion time according to the power redistribution result, and the recalculated estimated charge completion time may be displayed via the display unit of the electronic device and may be transmitted to the wireless power transmitter 100 through bidirectional communication.

Although the wireless power receiver 200 has been described above as calculating the estimated charge completion time, this is merely one embodiment, and the wireless power transmitter 200 according to another embodiment of the present invention may calculate the estimated charge completion time based on information about the maximum charge capacity of the load collected from the wireless power receiver 200, information about the charge amount of the current load, information about the intensity of power applied to the load, and the like. Here, the estimated charge completion time may be calculated for each wireless power receiver or each electronic device, which receives wireless power from the wireless power transmitter 100, and the wireless power transmitter 200 may display information about the calculated estimated charge completion time via the display unit.

In another example, the wireless power transmitter 200 may transmit, for example, information about wireless charging efficiency for each device that is being charged, information about the estimated charge completion time, and information about the amount of consumed power to another wireless power transmitter, a specific home network server, and/or a specific cloud server, which are connected via a network.

The home network server and/or the cloud server may statistically process and store the information received from the wireless power transmitter 200, and may extract and transmit the statistical information in response to a request from a user or a user terminal.

Figure 2:
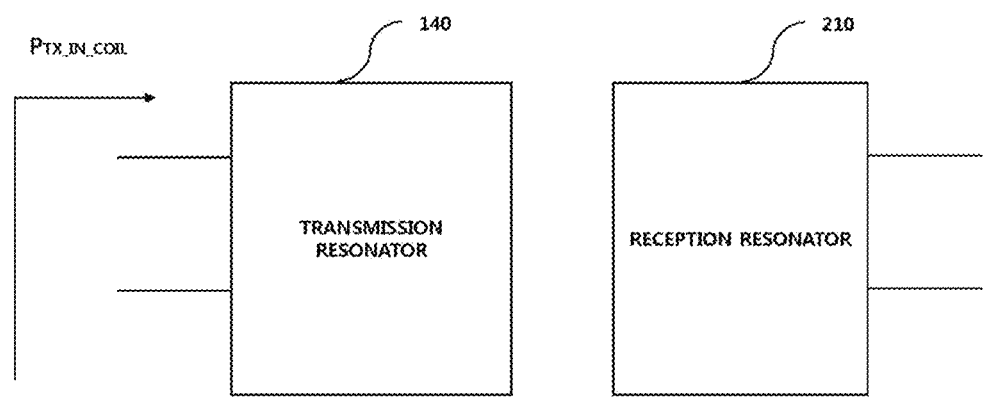
FIG. 2 is a view for explaining the type and characteristics of a wireless power transmitter according to an embodiment of the present invention.

FIG. 2 is a view for explaining the type and characteristics of a wireless power transmitter according to an embodiment of the present invention.

The type and characteristics of each of the wireless power transmitter and the wireless power receiver according to the present invention may be classified into a corresponding class and category.

The type and characteristics of the wireless power transmitter may be largely identified through the following three parameters.

First, the wireless power transmitter may be identified by a class determined according to the intensity of the maximum power applied to the transmission resonator 140.

Here, the class of the wireless power transmitter may be determined by comparing the maximum value of power PTXINCOIL applied to the transmission resonator 140 with predefined maximum input power $P_{TX\_IN\_MAX}$ specified in the following wireless power transmitter class table (hereinafter referred to as Table 1). Here, the power $P_{TX\_IN\_COIL}$ may be an average real number value calculated by dividing the product of a voltage V(t) and current I(t) applied to the transmission resonator 140 during a time by the time.

TABLE 1

| Class | Maximum Input Power | Minimum Category Support Requirement | Maximum Number of Supportable Devices |
|---|---|---|---|
| Class 1 | 2 W | 1 x Class 1 | 1 x Class 1 |
| Class 2 | 10 W | 1 x Class 3 | 2 x Class 2 |
| Class 3 | 16 W | 1 x Class 4 | 2 x Class 3 |
| Class 4 | 33 W | 1 x Class 5 | 3 x Class 3 |
| Class 5 | 50 W | 1 x Class 6 | 4 x Class 3 |
| Class 6 | 70 W | 1 x Class 6 | 5 x Class 3 |

The classes disclosed in the above Table 1 are merely one embodiment, and new classes may be added or deleted. In addition, it is to be noted that values for the maximum input power, the minimum category support requirement, and the maximum number of supportable devices for each class may vary according to the use, shape, and implementation mode of the wireless power transmitter.

For example, referring to Table 1, when the maximum value of the power $P_{TX\_IN\_COIL}$ applied to the transmission resonator 140 is greater than or equal to the $P_{TX\_IN\_MAX}$ value corresponding to class 3 and is less than the $P_{TX\_IN\_MAX}$ value corresponding to class 4, the class of the wireless power transmitter may be determined to be class 3.

Second, the wireless power transmitter may be identified according to the minimum category support requirement corresponding to the identified class.

Here, the minimum category support requirement may be the number of supportable wireless power receivers corresponding to the highest level category among categories of wireless power receivers that the wireless power transmitter of the corresponding class is capable of supporting. That is, the minimum category support requirement may be the minimum number of maximum category devices that the wireless power transmitter is capable of supporting. Here, the wireless power transmitter is capable of supporting all categories of wireless power receivers that are equal to or less than the maximum category depending on the minimum category support requirement.

However, the wireless power transmitter may be capable of supporting a wireless power receiver of a category higher than the category specified in the minimum category support requirement. In other words, the wireless power transmitter may not be limited in its ability to support wireless power receivers.

For example, referring to the above Table 1, a wireless power transmitter of class 3 needs to support at least one category 5 wireless power receiver. Of course, in this case, the wireless power transmitter may support the wireless power receiver 100 that corresponds to a category level lower than the category level corresponding to the minimum category support requirement.

In addition, it is to be noted that the wireless power transmitter may support a wireless power receiver in a higher level category when it is determined that the wireless power transmitter is capable of supporting a higher level category than the category corresponding to the minimum category support requirement.

Third, the wireless power transmitter may be identified by the maximum number of supportable devices corresponding to the identified class. Here, the maximum number of supportable devices may be identified by the maximum number of supportable wireless power receivers corresponding to the lowest level category among categories that may be supported by the identified class (hereinafter simply referred to as the maximum number of supportable devices).

For example, referring to the above Table 1, a wireless power transmitter of class 3 needs to be able to support up to two wireless power receivers of minimum category 3.

However, the wireless power transmitter may be capable of supporting more than the maximum number of devices corresponding to the class thereof. In other words, the wireless power transmitter is not limited so as to be incapable of supporting more than the maximum number of devices.

The wireless power transmitter according to the present invention needs to be able to perform wireless power transmission to at least a number of devices defined in the above Table 1 within available power when there is no particular reason not to allow a power transfer request from a particular wireless power receiver.

In one example, the wireless power transmitter may not accept a power transfer request from a wireless power receiver when there is not enough available power to accommodate the power transfer request. Alternatively, the power adjustment of the wireless power receiver may be controlled.

In another example, the wireless power transmitter may not accept a power transfer request from a wireless power receiver when the number of wireless power receivers that may be accepted is exceeded upon accepting the power transfer request.

In still another example, the wireless power transmitter may not accept a power transfer request from a wireless power receiver when the category of the wireless power receiver that requests power transfer exceeds a category level that may be supported in the class of the wireless power transmitter.

In a further example, the wireless power transmitter may not accept a power transfer request from a wireless power receiver when the internal temperature exceeds a reference value.

In particular, the wireless power transmitter according to the present invention may perform the power redistribution procedure based on the amount of current available power. Here, the power redistribution procedure may be performed in consideration of at least one of the category, the wireless power reception state, the required power amount, the priority, or the amount of consumed power of a wireless power receiver to which power is to be transmitted, which will be described below.

Here, the wireless power receiver may periodically or aperiodically transmit information about at least one of the category, the wireless power reception state, the required power amount, the priority, or the amount of consumed power of the wireless power receiver to the wireless power transmitter using at least one control signal via an out-of-band communication channel.

When the power redistribution procedure is completed, the wireless power transmitter may transmit the power redistribution result to the corresponding wireless power receiver through out-of-band communication.

The wireless power receiver may recalculate the estimated time required until completion of charging based on the received power redistribution result and transmit the recalculated result to the microprocessor of the connected electronic device. Subsequently, the microprocessor may perform control to display the recalculated estimated charge completion time on the display provided in the electronic device. At this time, the displayed estimated charge completion time may be controlled so as to disappear after being displayed on the screen for a predetermined time.

The microprocessor according to another embodiment of the present invention may perform control to further display information about the reason for recalculation when the estimated charge completion time is recalculated. To this end, the wireless power transmitter may also transmit information about the reason why the power redistribution has been performed to the wireless power receiver when transmitting the power redistribution result.

The wireless power receiver according to another embodiment of the present invention may transmit the recalculated estimated charge completion time to the wireless power transmitter through bidirectional communication. In this case, the wireless power transmitter may display the received estimated charge completion time via the provided display unit and transmit the estimated charge completion time to the home network server and/or the cloud server, which are connected via a network.

In addition, the wireless power transmitter according to an embodiment of the present invention may display the detection result via the provided display unit when an internal system error (including, for example, overvoltage, overcurrent, or overheating) is detected, and transmit the detection result to the home network server and/or the cloud server, which are connected via a network.

In addition, when it is confirmed that collected or calculated wireless charging efficiency or wireless power transmission efficiency is equal to or less than a predetermined reference value, the wireless power transmitter according to an embodiment of the present invention may display the confirmation result via the provided display unit and provide notification of the home network server and/or the cloud server, which are connected via a network, of the display of the confirmation result. The user may access the home network server or the cloud server to identify a wireless power transmitter having low wireless charging efficiency. Here, the wireless power transmitter having low wireless charging efficiency may be determined to be a wireless power transmitter located in a wireless power deadzone.

In addition, when the number of times that a power transmission request from the wireless power receiver is rejected due to the shortage of available power is equal to or greater than a reference value, the wireless power transmitter according to an embodiment of the present invention may provide notification of the result to the home network server and/or the cloud server, which are connected via a network. Here, the area in which the wireless power transmitter, which rejects the power transmission request a number of times equal to or greater than the reference value, is installed may be determined to be an area in which installation of an additional wireless power transmitter is required, or the area in which replacement with a wireless power transmitter having a higher power transmission capacity, i.e., having a higher class is required. In another example, the area in which the wireless power transmitter, which rejects the power transmission request the number of times equal to or greater than the reference value, is installed may be classified as a hazardous area in which an unauthorized or ineffective wireless power receiver or an electronic device equipped with such a wireless power receiver is located.

Figure 3:
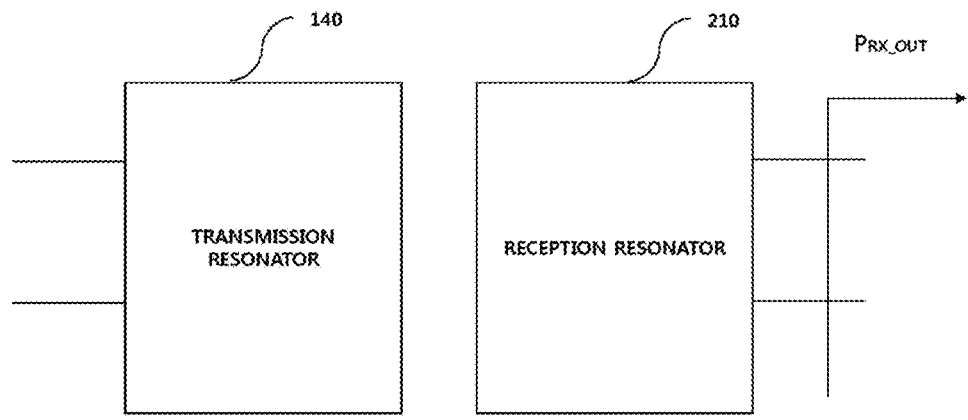
FIG. 3 is a view for explaining the type and characteristics of a wireless power receiver according to an embodiment of the present invention.

FIG. 3 is a view for explaining the type and characteristics of a wireless power receiver according to an embodiment of the present invention.

As illustrated in FIG. 3, the average output voltage $P_{RX\_OUT}$ of the reception resonator 210 may be a real number value calculated by dividing the product of a voltage V(t) and current I(t) output by the reception resonator 210 during a time by the time. For example, the average output voltage $P_{RX\_OUT}$ of the reception resonator 210 may be a real number value calculated by dividing the product of a voltage V(t) and current I(t) measured at the rectifier rear end by a time, without being limited thereto.

The category of the wireless power receiver may be defined based on the maximum output voltage $P_{RX\_OUT\_MAX}$ of the reception resonator 210, as illustrated in the following Table 2.

TABLE 2

| Category | Maximum Input Power | Application Example |
| --- | --- | --- |
| Category 1 | TBD | Bluetooth headset |
| Category 2 | 3.5 W | Feature Phone |
| Category 3 | 6.5 W | Smart Phone |
| Category 4 | 13 W | Tablet |
| Category 5 | 25 W | Small Laptop Computer |
| Category 6 | 37.5 W | Laptop Computer |
| Category 6 | 50 W | TBD |

For example, when charging efficiency at the load end is 80% or more, the wireless power receiver of category 3 may supply 5 W of power to a charging port of the load.

The categories disclosed in the above Table 2 are merely one embodiment, and new categories may be added or deleted. It is also to be noted that the maximum output power and the application example for each category illustrated in the above Table 2 may also vary according to the use, shape, and implementation mode of the wireless power receiver.

The wireless power receiver or the microprocessor of the electronic device connected to the wireless power receiver according to an embodiment of the present invention may calculate the estimated time required until the charging of the load is completed based on the maximum charge capacity of the load, the current charge amount of the load, the maximum or average input power of the wireless power transmitter, and the current charging efficiency at the category load end of the wireless power receiver, for example. Here, the maximum input power corresponding to the category of the wireless power receiver may be adaptively changed according to the power redistribution of the wireless power transmitter, so that the estimated time required until completion of charging may be recalculated and changed. At this time, information about the calculated estimated charge completion time may be transmitted to the wireless power transmitter via a bidirectional communication channel.

The wireless power transmitter according to another embodiment of the present invention may receive information about charging efficiency at the load end, the category of the wireless power receiver, the maximum charge capacity of the load, and the current charge amount of the load from the wireless power receiver through bidirectional communication. In this case, the wireless power transmitter may calculate the estimated time required until the charging of the load is completed.

Figure 4:
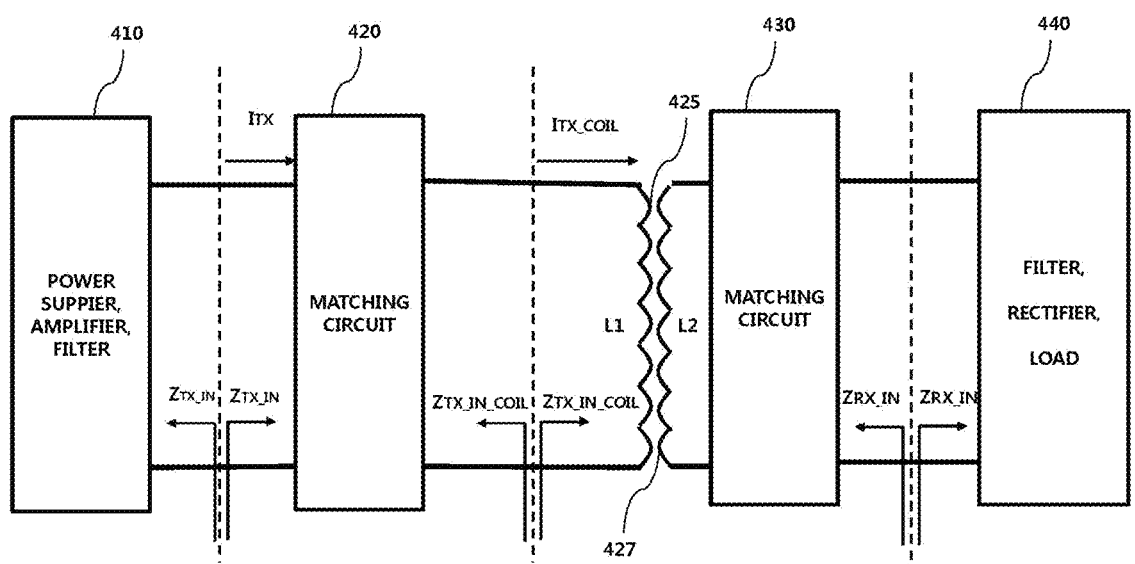
FIG. 4 is an equivalent circuit diagram of a wireless charging system according to an embodiment of the present invention.

FIG. 4 is an equivalent circuit diagram of a wireless charging system according to an embodiment of the present invention.

Specifically, FIG. 4 illustrates interface points on an equivalent circuit in which reference parameters, which will be described below, are measured.

Hereinafter, the meaning of the reference parameters illustrated in FIG. 4 will be briefly described.

"$I_{TX}$" and "$I_{TX\_COIL}$" respectively denote the root mean square (RMS) current applied to a matching circuit (or matching network) 420 of the wireless power transmitter and the RMS current applied to a transmission resonator coil 425 of the wireless power transmitter.

"$Z_{TX\_IN}$" denotes the input impedance at the rear end of a power supplier/amplifier/filter 410 of the wireless power transmitter and the input impedance at the front end of the matching circuit 420.

culated by dividing the power transmitted from the reception resonator coil to the load 440 by the power to be loaded in the resonant frequency band by the transmission resonator coil 425. The resonator coupling efficiency between the wireless power transmitter and the wireless power receiver may be calculated when the reference port impedance $Z_{TX\_IN}$ of the transmission resonator and the reference port impedance $Z_{RX\_IN}$ of the reception resonator are perfectly matched.

The following Table 3 is an example of the minimum resonator coupling efficiency depending on the class of the wireless power transmitter and the class of the wireless power receiver according to an embodiment of the present invention.

TABLE 3

|  | Category 1 | Category 2 | Category 3 | Category 4 | Category 5 | Category 6 | Category 7 |
| --- | --- | --- | --- | --- | --- | --- | --- |
| Class 1 | N/A | N/A | N/A | N/A | N/A | N/A | N/A |
| Class 2 | N/A | 74% (−1.3) | 74% (−1.3) | N/A | N/A | N/A | N/A |
| Class 3 | N/A | 74% (−1.3) | 74% (−1.3) | 76% (−1.2) | N/A | N/A | N/A |
| Class 4 | N/A | 50% (−3) | 65% (−1.9) | 73% (−1.4) | 76% (−1.2) | N/A | N/A |
| Class 5 | N/A | 40% (−4) | 60% (−2.2) | 63% (−2) | 73% (−1.4) | 76% (−1.2) | N/A |
| Class 5 | N/A | 30% (−5.2) | 50% (−3) | 54% (−2.7) | 63% (−2) | 73% (−1.4) | 76% (−1.2) |

"$Z_{TX\_IN\_COIL}$" denotes the input impedance at the rear end of the matching circuit 420 and at the front end of the transmission resonator coil 425.

"L1" and "L2" respectively denote the inductance value of the transmission resonator coil 425 and the inductance value of a reception resonator coil 427.

"$Z_{RX\_IN}$" denotes the input impedance at the rear end of a matching circuit 430 of the wireless power receiver and at the front end of a filter/rectifier/load 440 of the wireless power receiver.

The resonance frequency used for the operation of the wireless power transmission system according to the embodiment of the present invention may be 6.78 MHz±15 kHz.

In addition, the wireless power transmission system according to the embodiment may provide simultaneous charging, i.e., multi-charging, for a plurality of wireless power receivers. In this case, even if new wireless power receives are added or deleted, a change in the power received by the remaining wireless power receivers may be controlled so as not to exceed a predetermined reference value or more. For example, a change in the received power may be ±10%, without being limited thereto. When it is impossible to control a change in received power so as not to exceed a reference value, the wireless power transmitter may not accept a power transmission request from a newly added wireless power receiver.

As the condition for maintaining the change in the received power, when a wireless power receiver is added to or deleted from the charging area, the wireless power receiver must not overlap the existing wireless power receiver.

When the matching circuit 430 of the wireless power receiver is connected to a rectifier, a real number part of "$Z_{TX\_IN}$" may be inversely related to the load resistance of the rectifier (hereinafter referred to as $R_{RECT}$). That is, an increase in $R_{RECT}$ may decrease "$Z_{TX\_IN}$", and a decrease in $R_{RECT}$ may increase "$Z_{TX\_IN}$".

Resonator coupling efficiency according to the present invention may be the maximum power reception rate, cal- When a plurality of wireless power receivers is used, the minimum resonator coupling efficiency corresponding to the classes and categories illustrated in the above Table 3 may increase.

The wireless power receiver or the microprocessor of the electronic device connected to the wireless power receiver according to an embodiment of the present invention may calculate the estimated time required until the charging of the load is completed based on at least one of the maximum charge capacity of the load, the current charge amount of the load, the charging efficiency of the load, or the minimum resonator coupling efficiency corresponding to the category of the wireless power receiver and the class of the wireless power transmitter.

Figure 5:
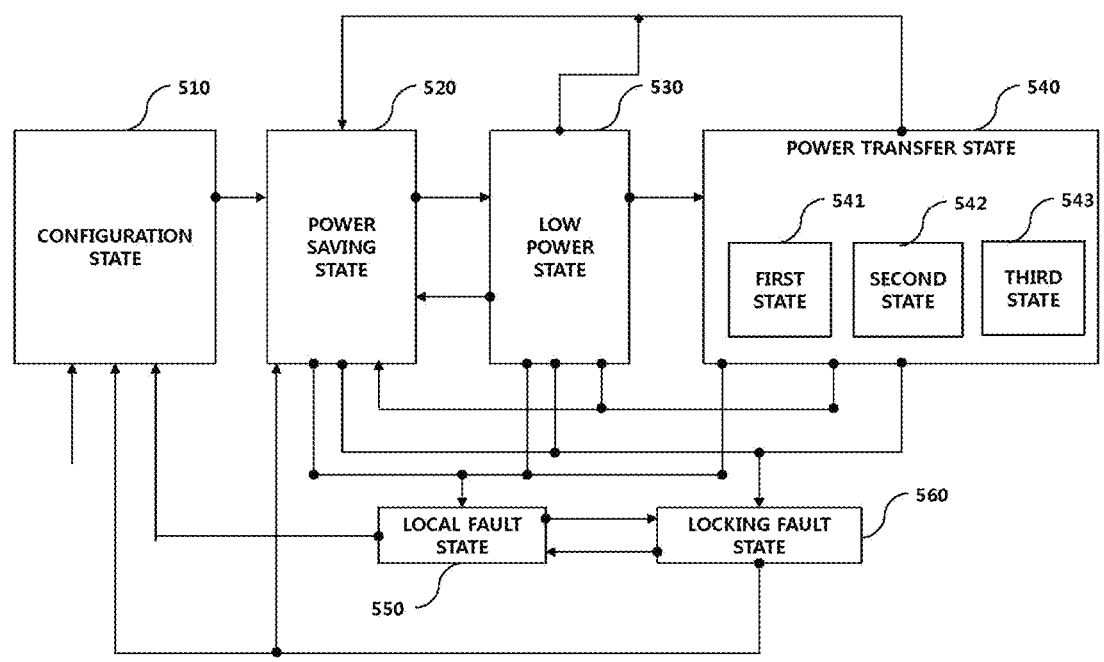
FIG. 5 is a state transition diagram for explaining a state transition procedure in a wireless power transmitter according to an embodiment of the present invention.

FIG. 5 is a state transition diagram for explaining a state transition procedure in a wireless power transmitter according to an embodiment of the present invention.

Referring to FIG. 5, the state of the wireless power transmitter may broadly include a configuration state 510, a power saving state 520, a low power state 530, a power transfer state 540, a local fault state 550, and a locking fault state 560.

When power is applied to the wireless power transmitter, the wireless power transmitter may transition to the configuration state 510. The wireless power transmitter may transition to the power saving state 520 when a predetermined reset timer expires or an initialization procedure is completed in the configuration state 510.

In the power saving state 520, the wireless power transmitter may generate a beacon sequence and transmit the beacon sequence through a resonance frequency band.

Here, the wireless power transmitter may control the beacon sequence to start within a predetermined time after entering the power saving state 520. For example, the wireless power transmitter may control the beacon sequence so as to start within 50 ms after transitioning to the power saving state 520, without being limited thereto.

In the power saving state 520, the wireless power transmitter may periodically generate and transmit a first beacon sequence for sensing the wireless power receiver, and may detect a change in the impedance of the reception resonator, i.e., load variation. Hereinafter, for convenience of explanation, the first beacon and the first beacon sequence will be referred to as a short beacon and a short beacon sequence, respectively.

In particular, the short beacon sequence may be repeatedly generated and transmitted at a constant time interval $t_{CYCLE}$ during a short period $t_{SHORT\_BEACON}$ so that standby power of the wireless power transmitter may be saved until the wireless power receiver is detected. For example, "$t_{SHORT\_BEACON}$" may be set to 30 ms or less, and "$t_{CYCLE}$" may be set to 250 ms±5 ms. In addition, the current intensity of the short beacon may be equal to or greater than a predetermined reference value, and may be gradually increased for a predetermined time period. For example, the minimum current intensity of the short beacon may be set to be sufficiently large that a wireless power receiver of category 2 or higher according to the above Table 2 may be detected.

The wireless power transmitter according to the present invention may be provided with a predetermined sensing unit for sensing a change in reactance and resistance in the reception resonator depending on the short beacon.

In addition, in the power saving state 520, the wireless power transmitter may periodically generate and transmit a second beacon sequence for providing sufficient power required for the booting and response of the wireless power receiver. Hereinafter, for convenience of explanation, the second beacon and the second beacon sequence will be referred to as a long beacon and a long beacon sequence, respectively.

That is, the wireless power receiver may broadcast a predetermined response signal through an out-of-band communication channel when booting is completed via the second beacon sequence.

In particular, the long beacon sequence may be generated and transmitted at a constant time interval $t_{LONG\_BEACON\_PERIOD}$ during a relatively long period $t_{LONG\_BEACON}$ compared to the short beacon in order to provide sufficient power required for the booting of the wireless power receiver. For example, "$t_{LONG\_BEACON}$" may be set to 105 ms+5 ms, and "$t_{LONG\_BEACON\_PERIOD}$" may be set to 850 ms. The current intensity of the long beacon may be stronger than the current intensity of the short beacon. In addition, the long beacon may maintain the power of a certain intensity during a transmission period.

Thereafter, the wireless power transmitter may stand by the reception of a predetermined response signal during a long beacon transmission period after a change in the impedance of the reception resonator is detected. Hereinafter, for convenience of explanation, the response signal will also be referred to as an advertisement signal. Here, the wireless power receiver may broadcast the advertisement signal through an out-of-band communication frequency band different from the resonant frequency band.

In one example, the advertisement signal may include at least one or any one of message identification information for identifying a message defined in the out-of-band, communication standard, unique service or wireless power receiver identification information for identifying whether or not the wireless power receiver is legitimate or compatible with the wireless power transmitter, output power information of the wireless power receiver, information about rated voltage/current applied to the load, antenna gain information of the wireless power receiver, information for identifying the category of the wireless power receiver, wireless power receiver authentication information, information about whether or not an overvoltage protection function is installed, or information about the version of software mounted in the wireless power receiver. In another example, the advertisement signal may include information about the maximum charge capacity of the load, information about the current charge amount of the load, or the like.

The wireless power transmitter may establish an out-of-band communication link with the wireless power receiver after transitioning from the power saving state 520 to the low power state 530 when receiving the advertisement signal. Subsequently, the wireless power transmitter may perform a registration procedure for the wireless power receiver through the established out-of-band communication link. For example, when the out-of-band communication is Bluetooth low power communication, the wireless power transmitter may perform Bluetooth pairing with the wireless power receiver, and may mutually exchange at least one of state information, characteristic information, or control information through the paired Bluetooth link.

When the wireless power transmitter transmits a predetermined control signal for initiating charging via out-of-band communication in the low power state 530 (i.e., a predetermined control signal requesting the wireless power receiver to transfer power to the load) to the wireless power transmitter, the wireless power transmitter may transition from the low power state 530 to the power transfer state 540.

When the out-of-band communication link establishment procedure or the registration procedure is not completed normally in the low power state 530, the wireless power transmitter may transition from the low power state 530 to the power saving state 520.

In the wireless power transmitter, a separate link expiration timer may be driven for connection with each wireless power receiver, and the wireless power receiver needs to transmit a predetermined message indicating the existence thereof to the wireless power transmitter at a predetermined time interval before the link expiration timer expires. The link expiration timer may be reset each time the message is received, and the out-of-band communication link established between the wireless power receiver and the wireless power receiver may be maintained when the link expiration timer does not expire.

When all link expiration timers corresponding to the out-of-band communication link established between the wireless power transmitter and at least one wireless power receiver have expired in the low power state 530 or the power transfer state 540, the wireless power transmitter may transition to the power saving state 520.

In addition, the wireless power transmitter in the low power state 530 may drive a predetermined registration timer when a valid advertisement signal is received from the wireless power receiver. At this time, when the registration timer expires, the wireless power transmitter in the low power state 530 may transition to the power saving state 520. At this time, the wireless power transmitter may output a predetermined notification signal indicating failure of registration through a notification display unit provided in the wireless power transmitter, for example, an LED lamp, a display screen, or a beeper.

In addition, in the power transfer state 540, the wireless power transmitter may transition to the low power state 530 when charging of all connected wireless power receivers is completed.

In particular, the wireless power receiver may allow registration of a new wireless power receiver in a state other than the configuration state 510, the local fault state 550, and the locking fault state 560.

In addition, the wireless power transmitter may dynamically control transmission power based on state information received from the wireless power receiver in the power transfer state 540.

Here, the receiver state information transmitted from the wireless power receiver to the wireless power transmitter may include at least one of required power information, information about the voltage and/or current measured at the rear end of the rectifier, charge state information, information for providing notification of overcurrent and/or overvoltage and/or overheating, or information indicating whether or not a device that interrupts or reduces power transmitted to the load according to overcurrent or overvoltage is activated. At this time, the receiver state information may be transmitted at a predetermined period, or may be transmitted each time a specific event is generated. In addition, the device that interrupts or reduces the power transmitted to the load according to overcurrent or overvoltage may be provided using at least one of an ON/OFF switch or a Zener diode. In addition, the charge state information may include at least one of information about the current charge amount of the load, information indicating whether or not the charging of the load is completed, or information about the estimated charge completion time.

The receiver state information transmitted from the wireless power receiver to the wireless power transmitter according to another embodiment of the present invention may further include at least one of information indicating that a external power supply unit is connected to the wireless power receiver by a wire, or information indicating that the out-of-band communication method is changed (e.g., information indicating that a change from near field communication (NFC) to Bluetooth Low Energy (BLE) communication is possible).

According to still another embodiment of the present invention, the wireless power transmitter may adaptively determine the intensity of power to be received for each wireless power receiver or the intensity of power to be transmitted to each wireless power receiver based on at least one of current available power thereof, the priority of each wireless power receiver, or the number of connected wireless power receivers. Here, the intensity of power for each wireless power receiver may be determined according to the ratio of power to be received to the maximum power that may be processed by the rectifier of the wireless power receiver.

The wireless power transmitter may then transmit a predetermined power control command, including information about the determined power intensity, to the wireless power receiver. Here, the wireless power receiver may determine whether or not power control is possible based on the power intensity determined by the wireless power transmitter, and may transmit the determination result to the wireless power transmitter through a predetermined power control response message.

The wireless power receiver according to a further embodiment of the present invention may transmit predetermined receiver state information indicating whether or not wireless power control is possible in response to a power adjustment command of the wireless power transmitter before receiving the power control command.

The power transfer state 540 may be any one of a first state 541, a second state 542, and a third state 543 according to the power reception state of the connected wireless power receiver.

For example, the first state 541 may indicate that the power reception state of all wireless power receivers connected to the wireless power transmitter is in a normal voltage state.

The second state 542 may indicate that the power reception state of at least one wireless power receiver connected to the wireless power transmitter is in a low voltage state and there is no wireless power receiver in a high voltage state.

The third state 543 may indicate that the power reception state of at least one wireless power receiver connected to the wireless power transmitter is in a high voltage state.

The wireless power transmitter may transition to the locking fault state 560 when a system error is detected in the power saving state 520, the low power state 530, or the power transfer state 540.

The wireless power transmitter in the locking fault state 560 may transition to either the configuration state 510 or the power saving state 520 when it is determined that all connected wireless power receivers have been removed from the charging area.

In addition, in the locking fault state 560, the wireless power transmitter may transition to the local fault state 550 when a local fault is detected. Here, the wireless power transmitter in the local fault state 550 may transition back to the locking fault state 560 when the local fault is overcome.

On the other hand, when transitioning from any one of the configuration state 510, the power saving state 520, the low power state 530, and the power transfer state 540 to the local fault state 550, the wireless power transmitter may transition to the configuration state 510 when the local fault is overcome.

The wireless power transmitter may interrupt the power supplied to the wireless power transmitter when transitioning to the local fault state 550. For example, the wireless power transmitter may transition to the local fault state 550 when a fault such as overvoltage, overcurrent, or overheating is detected, without being limited thereto.

In one example, the wireless power transmitter may transmit a predetermined power control command to at least one wireless power receiver connected thereto for reducing the intensity of power received by the wireless power receiver when overcurrent, overvoltage, overheating, or the like is detected.

In another example, the wireless power transmitter may transmit a predetermined control command to at least one wireless power receiver connected thereto for interrupting charging of the wireless power receiver when overcurrent, overvoltage, overheating, or the like is detected.

Through the power control procedure described above, the wireless power transmitter may prevent damage to the device due to overvoltage, overcurrent, overheating, or the like.

In addition, when, for example, overcurrent, overvoltage, overheating, and a local fault (e.g., expiration of a timer for message handling) of the connected wireless power receiver is detected, the wireless power transmitter may transmit the detected result to the home network server and/or the cloud server for wireless power management, which are connected via a network.

In addition, when, for example, the overcurrent, overvoltage, overheating, and local fault in the transmitter is detected, the wireless power transmitter may detect the detected result to the home network server and/or the cloud server for wireless power management, which are connected via a network.

The wireless power transmitter may transition to the locking fault state 560 when the intensity of current output from the transmission resonator is a reference value or more. At this time, the wireless power transmitter, having transitioned to the locking fault state 560, may attempt to make the intensity of the output current of the transmission resonator equal to or less than a reference value for a predesignated time. Here, the attempt may be repeated a predesignated number of times. When the locking fault state 560 is not released despite repeated attempts, the wireless power transmitter may transmit a predetermined notification signal indicating that the locking fault state 560 is not released to the user using a predetermined notification unit. At this time, when all wireless power receivers located in the charging area of the wireless power transmitter are removed from the charging area by the user, the locking fault state 560 may be released.

In addition, when the locking fault state 560 is not released for a predetermined time, the wireless power transmitter may transmit a predetermined notification signal indicating that the locking fault state 560 is not released to the home network server, the cloud server for wireless power management, and/or an adjacent wireless power transmitter, which are connected via a network.

On the other hand, when the intensity of the output current of the transmission resonator falls below the reference value within the predesignated time, or when the intensity of the output current of the transmission resonator falls below the reference value while the attempts are repeated the predesignated number of times, the locking fault state 560 may automatically released. At this time, the wireless power transmitter may automatically transition from the locking fault state 560 to the power saving state 520 to perform a detection and identification procedure again for the wireless power receiver.

The wireless power transmitter in the power transfer state 540 may transmit continuous power and adaptively control transmission power based on the state information of the wireless power receiver and predefined optimal voltage region establishment parameters.

For example, the optimal voltage region establishment parameters may include at least one of a parameter for identifying a low voltage region, a parameter for identifying an optimal voltage region, a parameter for identifying a high voltage region, or a parameter for identifying an overvoltage region.

The wireless power transmitter may increase the transmission power when the power reception state of the wireless power receiver is in the low voltage region, and may reduce the transmission power when the power reception state is in the high voltage region.

In addition, the wireless power transmitter may also control the transmission power in order to maximize power transmission efficiency.

In addition, the wireless power transmitter may also control the transmission power so that the deviation of the amount of power required by the wireless power receiver becomes equal to or less than a reference value.

The wireless power transmitter may also stop power transmission when the rectifier output voltage of the wireless power receiver reaches a predetermined overvoltage region, that is, when overvoltage is detected.

The wireless power receiver or the electronic device connected to the wireless power receiver according to the present invention may calculate the estimated time required until the charging of the load is completed when a change in the received power in the power transfer state 540 is stabilized to be equal to or less than a reference value.

In one example, the wireless power receiver may determine that power reception is stabilized when the difference between the average intensity of a voltage or current measured at the rear end of the rectifier for a time and a predetermined optimal voltage or current intensity is equal to or less than a reference value.

In another example, the wireless power transmitter may determine whether or not power control to the wireless power receiver is stabilized based on state information received from the wireless power receiver. When power control is stabilized, the wireless power transmitter may calculate the estimated charge completion time based on the maximum charge capacity of the load, the current charge amount of the load, the charging efficiency of the load, and the like, which are previously collected.

In one example, the wireless power transmitter may receive information about the intensity of voltage $V_{RECT}$ measured at the rear end of the rectifier from the wireless power receiver. In this case, the wireless power transmitter may determine that power control is stabilized when the difference between a predetermined number of successively received $V_{RECT}$ values is maintained within a reference value or when the difference between the $V_{RECT}$ values received for a predetermined time is maintained within the reference value.

In another example, the wireless power transmitter may determine that power control is stabilized when state information is not received from the wireless power receiver for a predetermined time in the power transfer state 540.

Figure 6:
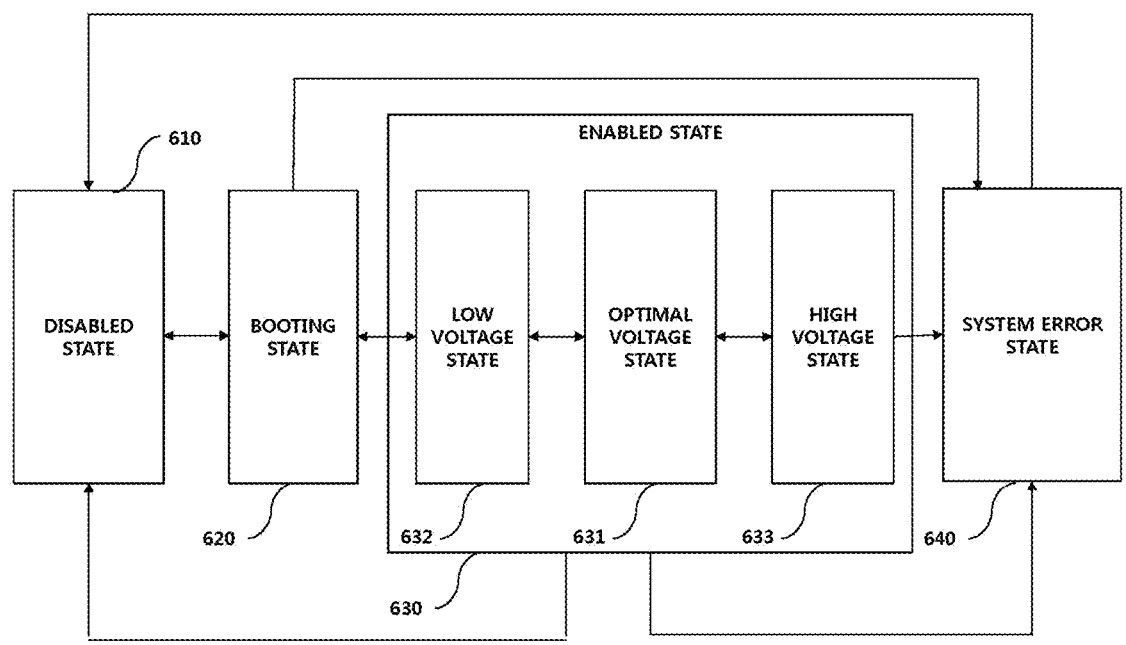
FIG. 6 is a state transition diagram of a wireless power receiver according to an embodiment of the present invention.

FIG. 6 is a state transition diagram of the wireless power receiver according to an embodiment of the present invention.

Referring to FIG. 6, the state of the wireless power receiver may include a disabled state 610, a booting state 620, an enabled state 630 (or an On state), and a system error state 640.

Here, the state of the wireless power receiver may be determined based on the intensity of an output voltage at the rectifier end of the wireless power receiver (hereinafter referred to as "$V_{RECT}$" for convenience of explanation).

The enabled state 630 may be divided into an optimal voltage state 631, a low voltage state 632, and a high voltage state 633 according to the value of $V_{RECT}$.

The wireless power receiver in the disabled state 610 may transition to the booting state 620 when the measured $V_{RECT}$ value is greater than or equal to a predefined $V_{RECT\_BOOT}$ value.

In the booting state 620, the wireless power receiver may establish an out-of-band communication link with the wireless power transmitter, and may stand by until the $V_{RECT}$ value reaches the power required at the load end.

The wireless power receiver in the booting state 620 may transition to the enabled state 630 and start charging when it is confirmed that the $V_{RECT}$ value has reached the power required at the load end.

The wireless power receiver in the enabled state 630 may transition to the booting state 620 when it is confirmed that charging is completed or when charging is interrupted.

In addition, the wireless power receiver in the enabled state 630 may transition to the system error state 640 when a certain system error is detected. Here, system errors may include overvoltage, overcurrent, overheating, and other predefined system error conditions.

In addition, the wireless power receiver in the enabled state 630 may transition to the disabled state 610 when the $V_{RECT}$ value becomes equal to or less than the $V_{RECT\_BOOT}$ value.

In addition, the wireless power receiver in the booting state 620 or in the system error state 640 may transition to the disabled state 610 when the $V_{RECT}$ value becomes equal to or less than the $V_{RECT\_BOOT}$ value.

The wireless power receiver or the electronic device connected to the wireless power receiver according to the present invention may calculate the estimated time required until the charging of the load is completed when a change in the received power in the enabled state 630 is stabilized to be equal to or less than a reference value.

For example, the wireless power receiver may determine that power reception is stabilized when the average intensity of voltage $V_{RECT}$ measured at the rear end of the rectifier for a time has a deviation equal to or less than a reference value about a predetermined optimal voltage or current intensity.

Hereinafter, the state transition of the wireless power receiver in the enabled state 630 will be described in detail with reference to FIG. 7, which will be described below.

Figure 7:
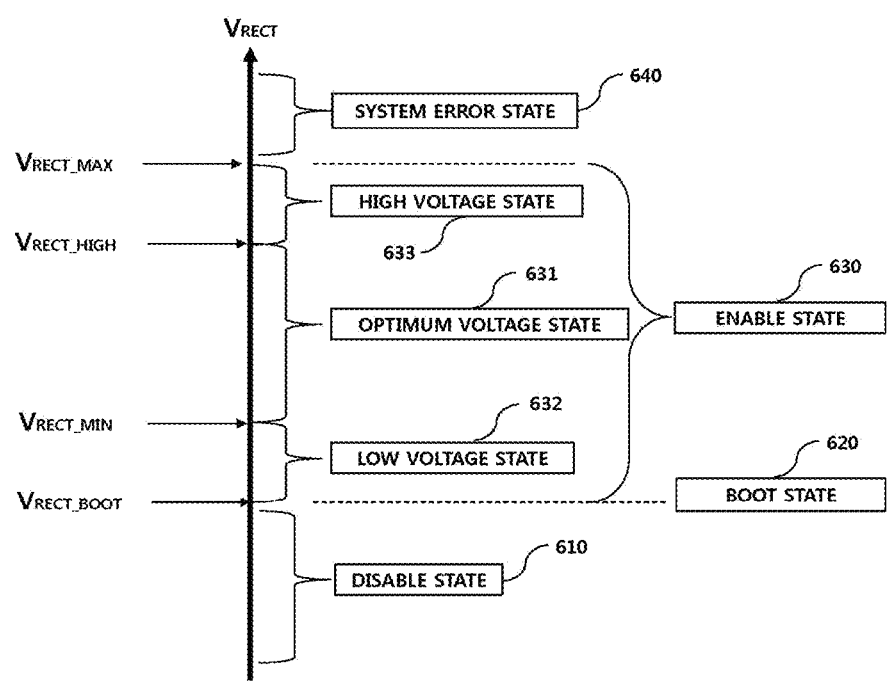
FIG. 7 is a view for explaining an operation region of the wireless power receiver according to a $V_{RECT}$ according to an embodiment of the present invention.

FIG. 7 is a diagram for explaining an operation region of the wireless power receiver depending on a $V_{RECT}$ according to an embodiment of the present invention.

Referring to FIG. 7, when the $V_{RECT}$ value is less than a predetermined $V_{RECT\_BOOT}$ value, the wireless power receiver is held in the disabled state 610.

Thereafter, when the $V_{RECT}$ value is increased to the $V_{RECT\_BOOT}$ value or more, the wireless power receiver may transition to the booting state 620 and broadcast an advertisement signal within a predesignated time. Thereafter, when the advertisement signal is detected by the wireless power transmitter, the wireless power transmitter may transmit a predetermined connection request signal for establishing an out-of-band communication link to the wireless power receiver.

When the out-of-band communication link is successfully established and registration succeeds, the wireless power receiver may stand by until the $V_{RECT}$ value reaches the minimum output voltage at the rectifier for normal charging (hereinafter referred to as "$V_{RECT\_MIN}$" for convenience of explanation).

When the $V_{RECT}$ value exceeds the $V_{RECT\_MIN}$ the wireless power receiver may transition from the booting state 620 to the enabled state 630, and the load may begin to be charged.

In the enabled state 630, when the $V_{RECT}$ value exceeds "$V_{RECT\_MAX}$" that is a predetermined reference value for determining overvoltage, the wireless power receiver may transition from the enabled state 630 to the system error state 640.

Referring to FIG. 7, the enabled state 630 may be divided into a low voltage state 632, an optimal voltage state 631, and a high voltage state 633 according to the $V_{RECT}$ value.

The low voltage state 632 may be a $V_{RECT\_BOOT} \leq V_{RECT} \leq V_{RECT\_MIN}$ state, the optimal voltage state 631 may be a $V_{RECT\_MIN} \leq V_{RECT} \leq V_{RECT\_HIGH}$ state, and the high voltage state 633 may be a $V_{RECT\_HIGH} < V_{RECT} \leq V_{RECT\_MAX}$ state.

In particular, the wireless power receiver, having transitioned to the high voltage state 633, may suspend the operation of interrupting the power supplied to the load for a predesignated time (hereinafter referred to as a high voltage state holding time for convenience of explanation). Here, the high voltage state holding time may be predetermined so as to prevent damage to the wireless power receiver and the load in the high voltage state 633.

When the wireless power receiver transitions to the system error state 640, a predetermined message indicating the occurrence of overvoltage may be transmitted to the wireless power transmitter through an out-of-band communication link within a predesignated time.

The wireless power receiver may also control the voltage applied to the load using an overvoltage cutoff device provided to prevent damage to the load due to overvoltage in the system error state 630. Here, an ON/OFF switch and/or a Zener diode may be used as the overvoltage cutoff device.

Although a method and a device for responding to a system error in the wireless power receiver when overvoltage is generated in the wireless power receiver, thereby causing the wireless power receiver to transition to the system error state 640 has been described in the above embodiment, this is merely one embodiment, and in another embodiment of the present invention, the wireless power receiver may also transition to the system error state due to overheating, overcurrent, or the like in the wireless power receiver.

For example, when transitioning to the system error state due to overheating, the wireless power receiver may transmit a predetermined message indicating the occurrence of overheating to the wireless power transmitter. Here, the wireless power receiver may reduce the amount of heat that is generated therein by driving a cooling fan or the like.

A wireless power receiver according to another embodiment of the present invention may receive wireless power in cooperation with a plurality of wireless power transmitters. In this case, the wireless power receiver may transition to the system error state 640 when it is determined that a wireless power transmitter that is determined to actually receive wireless power is different from a wireless power transmitter with which an actual out-of-band communication link is established.

The wireless power receiver according to an embodiment of the present invention may determine that power reception is stabilized when the intensity of the voltage $V_{RECT}$ measured at the rear end of the rectifier is maintained in the optimal voltage state 631 for a certain time. The wireless power receiver or the electronic device connected to the wireless power receiver may calculate the estimated time required until the charging of the load is completed when it is determined that power reception is stabilized.

Hereinafter, a signaling procedure between the wireless power transmitter and the wireless power receiver according to the present invention will be described in detail with reference to the following drawings.

Figure 8:
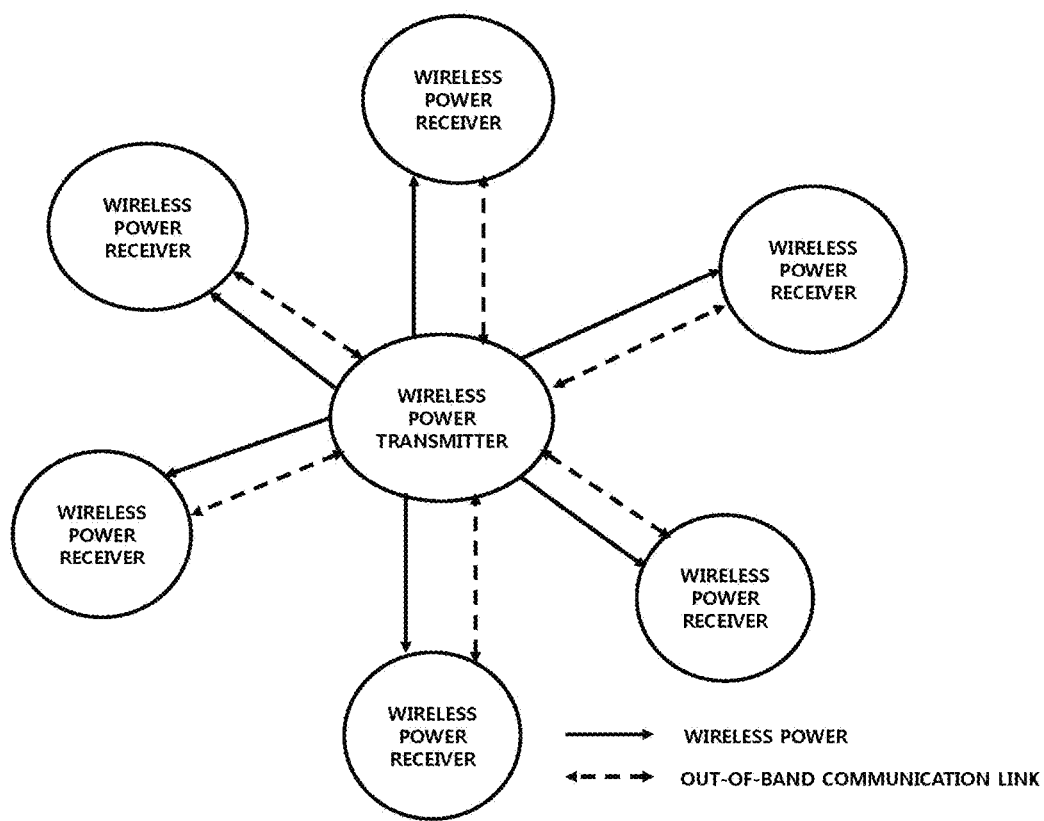
FIG. 8 is a view illustrating the configuration of the wireless charging system according to an embodiment of the present invention.

FIG. 8 is a view illustrating the configuration of the wireless charging system according to an embodiment of the present invention.

As illustrated in FIG. 8, the wireless charging system may be configured using star topology, without being limited thereto.

The wireless power transmitter may collect various pieces of characteristic information and state information from the wireless power receiver via an out-of-band communication link, and may control the operation and transmission power of the wireless power receiver based on the collected information.

The wireless power transmitter may also transmit transmitter characteristic information and a predetermined control signal to the wireless power receiver via an out-of-band communication link.

The wireless power transmitter may also determine the order in which to transmit power to respective wireless power receivers connected thereto, and may transmit wireless power according to the determined power transmission order. In one example, the wireless power transmitter may determine the power transmission order based on at least one of the category of the wireless power receiver, the pre-assigned priority for the wireless power receiver, the power reception efficiency of the wireless power receiver or the power transmission efficiency of the wireless power transmitter, the minimum resonance coupling efficiency between the wireless power transmitter and the wireless power receiver, the charging efficiency of the load, the charge state of the wireless power receiver, or the occurrence of a system error for each wireless power receiver.

In another example, the wireless power transmitter may transmit power simultaneously to a plurality of wireless power receivers. In still another example, when a plurality of wireless power receivers are connected thereto, the wireless power transmitter may determine a transmission slot for each connected wireless power receiver and transmit power in a time division manner.

The wireless power transmitter may also determine the amount of power to be transmitted to each connected wireless power receiver. For example, the wireless power transmitter may calculate the amount of power to be transmitted for each wireless power receiver based on, for example, the current available amount of power and the power reception efficiency for each wireless power receiver, and may transmit information about the calculated amount of power to the wireless power receiver via a predetermined control message.

In addition, for example, when a new wireless power receiver is added to the charging area, when the existing wireless power receiver that is being charged is removed from the charging area, when the charging of the existing wireless power receiver is completed, when a system error is detected in the wireless power receiver that is being charged, or when a change in the wireless charge state is detected, the wireless power transmitter may initiate a power redistribution procedure. At this time, the power redistribution result may be transmitted to the connected wireless power receiver via a predetermined control message.

The wireless power transmitter may also generate and provide a time synchronization signal to the wireless power receiver for obtaining time synchronization with wireless power receiver(s), which are connected via a network. Here, the time synchronizing signal may be transmitted through a frequency band for transmitting wireless power, i.e., a frequency band for performing in-band or out-of-band communication (i.e., an out-of-band). The wireless power transmitter and the wireless power receiver may manage mutual communication timing and a communication sequence based on the time synchronization signal.

Although FIG. 8 illustrates a configuration in which a wireless charging system including one wireless power transmitter and a plurality of wireless power receivers is networked using star topology, this is merely one embodiment, and the wireless charging system according to another embodiment of the present invention may be configured such that a plurality of wireless power transmitters and a plurality of wireless power receivers are mutually connected via a network so as to dynamically form a link and transmit and receive wireless power. In this case, the wireless power transmitter may share transmitter state information and/or state information of the wireless power receiver connected thereto via a separate communication channel with other wireless power transmitters connected thereto via a network. In addition, when the wireless power receiver is a movable device, the wireless power receiver may perform control to enable continuous power reception through handover between the wireless power transmitters.

When one wireless power receiver receives wireless power from multiple wireless power transmitters simultaneously during the handover process, the wireless power receiver may sum the power received from the respective wireless power transmitters and, based on the summed result, may calculate the estimated time required until the charging of the load is completed. That is, the wireless power receiver or the electronic device connected to the wireless power receiver may adaptively calculate the estimated charge completion time according to the handover and perform control to display the estimated charge completion time on the display screen.

The wireless power transmitter may also operate as a network coordinator and may exchange information with the wireless power receiver via an out-of-band communication link. For example, the wireless power transmitter may receive various pieces of information of the wireless power receiver to generate and manage a predetermined device control table, and may transmit network management information to the wireless power receiver based on the device control table. This may allow the wireless power transmitter to create and maintain a wireless charging system network.

Figure 9:
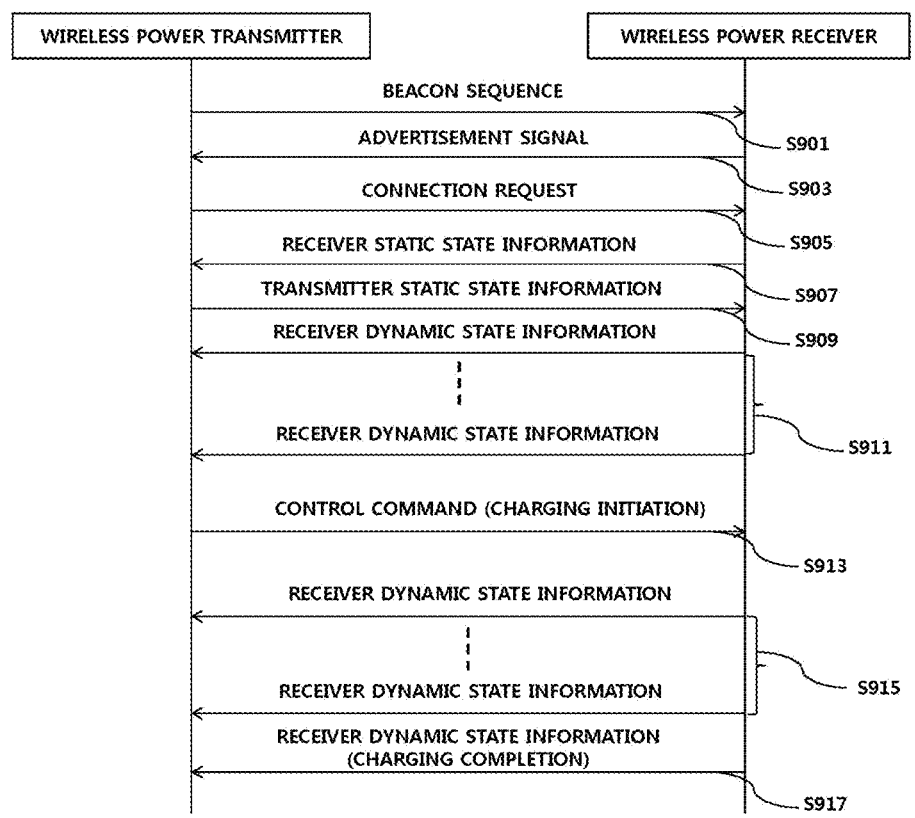
FIG. 9 is a flowchart for explaining a wireless charging procedure according to an embodiment of the present invention.

FIG. 9 is a flowchart for explaining a wireless charging procedure according to an embodiment of the present invention.

Referring to FIG. 9, the wireless power transmitter may generate a beacon sequence and transmit the beacon sequence through the transmission resonator when the wireless power transmitter is completely configured, that is, when booting is completed, according to power application (S901).

When detecting the beacon sequence, the wireless power receiver may broadcast an advertisement signal including identification information and characteristic information thereof (S903). Here, it is to be noted that the advertisement signal may be repeatedly transmitted at a predetermined interval until a connection request signal, which will be described below, is received from the wireless power transmitter.

When receiving the advertisement signal, the wireless power transmitter may transmit a predetermined connection request signal to the wireless power receiver for establishing an out-of-band communication link (S905).

When receiving the connection request signal, the wireless power receiver may establish an out-of-band communication link and transmit static state information thereof through the established out-of-band communication link (S907).

Here, the static state information of the wireless power receiver may include at least one of category information, hardware and software version information, maximum rectifier output power information, initial reference parameter information for power control, information about demand voltage or power, information for identifying whether or not a power adjustment function is installed, information about a supportable out-of-band communication method, information about a supportable power control algorithm, or information about a preferred rectifier terminal voltage value that is initially set in the wireless power receiver. In addition, the static state information of the wireless power receiver may include information about the maximum capacity of the load and information about the current charge amount of the load, for example.

The wireless power transmitter may transmit the static state information of the wireless power transmitter to the wireless power receiver through the out-of-band communication link when receiving the static state information of the wireless power receiver (S909).

Here, the static state information of the wireless power transmitter may include at least one of transmitter output power information, class information, hardware and software version information, information about the maximum number of supportable wireless power receivers, and/or information about the number of currently connected wireless power receivers.

Thereafter, the wireless power receiver may monitor the real-time power reception state and charge state thereof, and may transmit dynamic state information to the wireless power transmitter periodically or when a specific event occurs (S911).

Here, the dynamic state information of the wireless power receiver may include at least one of information about a rectifier output voltage and current, information about the voltage and current applied to the load, information about the measured internal temperature of the wireless power receiver, reference parameter change information (including a minimum rectified voltage value, a maximum rectified voltage value, and an initially set preferred rectifier terminal voltage change value) for power control, charge state information (including, e.g., information about whether or not charging is completed and information about the current charge amount of the load), system error information, or alarm information (including, e.g., local fault information). The wireless power transmitter may perform power adjustment by changing a set value included in the existing static state information when receiving the reference parameter change information for power control.

In addition, the wireless power transmitter may transmit a predetermined control command through an out-of-band communication link to control the wireless power receiver to initiate charging when sufficient power is available to charge the wireless power receiver (S913).

Thereafter, the wireless power transmitter may receive the dynamic state information from the wireless power receiver and dynamically control transmission power (S915).

In addition, when an internal system error is detected or when charging is completed, the wireless power receiver may transmit, to the wireless power transmitter, data for identifying the system error and/or data indicating that charging is completed, as well as the dynamic state information (S917). Here, system errors may include overcurrent, overvoltage, overheating, and the like.

In addition, a wireless power transmitter according to another embodiment of the present invention may redistribute the power to be transmitted to each wireless power receiver when current available power does not meet the required power of all wireless power receivers connected thereto, and may transmit the power to the corresponding wireless power receivers via a predetermined control command.

In addition, when a new wireless power receiver is additionally registered or connected during wireless charging, the wireless power transmitter may redistribute power to be received for each connected wireless power receiver based on current available power, and transmit the power to the wireless power receiver via a predetermined control command.

In addition, when the charging of the existing connected wireless power receiver is completed during wireless charging or when the out-of-band communication link is released (e.g., when the wireless power receiver is removed from the charging area), the wireless power transmitter may redistribute the power to be received by each wireless power receiver, and may transmit the power to the corresponding wireless power receiver through a predetermined control command.

In addition, the wireless power transmitter may confirm whether or not the wireless power receiver is equipped with a power control function through a predetermined control procedure. In this case, the wireless power transmitter may perform power redistribution only on the wireless power receiver equipped with the power control function when a power redistribution situation occurs.

For example, the power redistribution situation may occur upon the occurrence of an event, such as the case in which a valid advertisement signal is received from an unconnected wireless power receiver so that a new wireless power receiver is added, the case in which a dynamic parameter indicating, for example, the current state of a connected wireless power receiver is received, the case in which a previously connected wireless power receiver no longer exists, the case in which charging of a previously connected wireless power receiver has been completed, or the case in which an alarm message that indicates the system error state of the previously connected wireless power receiver is received.

Here, the system error state may include an overvoltage state, an overcurrent state, an overheating state, a network connection state, or the like.

For example, the wireless power transmitter may transmit information about power redistribution to the wireless power receiver via a predetermined control command.

Here, the information about power redistribution includes command information for power control of the wireless power receiver, information for identifying whether a power transfer request is permitted or denied, information for generating a change in valid load by the wireless power receiver, and the like.

Here, the command for the power control of the wireless power receiver may include, for example, a first command for performing control so that the wireless power receiver provides received power to the load, a second command for making the wireless power receiver indicate that charging is being performed, and a power adjustment command that indicates the ratio of the maximum power that may be provided by the wireless power transmitter to the maximum rectifier power of the wireless power receiver.

When the wireless power receiver does not support the power control command, the wireless power transmitter may not transmit a power control command to the wireless power receiver.

For example, when a new wireless power receiver is registered, the wireless power transmitter may determine whether or not the wireless power transmitter is capable of providing the power amount required by the wireless power receiver based on the available power amount thereof. When the determination result is that the required amount of power exceeds the amount of available power, the wireless power transmitter may confirm whether or not the power control function is provided in the corresponding wireless power receiver. When the confirmation result is that the power control function is provided, the wireless power receiver may determine the amount of power that the wireless power receiver will receive within the available power amount, and may transmit the determined result to the wireless power receiver through a predetermined control command.

Of course, the power redistribution may be performed within a range in which the wireless power transmitter and the wireless power receiver are normally operable and/or within a range in which normal charging is possible.

In addition, the information for identifying whether the power transfer request is permitted or denied may include an permission condition or a reason for denial.

For example, the permission condition may include an permission under the promise of standby for a certain time due to the lack of available power. The reason for denial may include denial due to the lack of available power, denial due to exceeding the number of wireless power receivers that may be accepted, denial due to overheating of the wireless power transmitter, or denial due to the limited class of the wireless power transmitter, for example.

The wireless power transmitter according to an embodiment of the present invention may collect detailed information about the permission and denial of power transfer requests for a time and transmit the collected detailed permission and denial information to the home network server and/or the cloud server, which are connected via a network. Here, the collected detailed permission and denial information may include information about at least one of the total number of times a power transfer request is received, the total number of permissions, the total number of denials, the number of immediate permissions, the number of permissions after standby, the number of denials due to power shortage, the number of denials due to an excessive number of wireless power receivers, the number of denials due to wireless power transmitter system errors, the number of denials due to authentication failures, or the number of denials due to a specific class.

The home network server and/or the cloud server for power management may statistically process the collected detailed permission and denial information for each wireless power transmitter, and may automatically transmit the processed statistical information to a predesignated user terminal, for example, or may transmit the information to the user terminal in response to a user inquiry request. The user may determine whether to add/change/remove the wireless power transmitter based on the received statistical information.

In another example, the home network server and/or the cloud server for power management may determine whether to add/change/remove the wireless power transmitter based on the collected detailed permission and denial information for each wireless power transmitter, and may transmit the determined result to a predesignated user terminal.

A wireless power receiver according to another embodiment of the present invention may support a plurality of out-of-band communication methods. When it is desired to change the currently established out-of-band communication link to a different one, the wireless power receiver may transmit a predetermined control signal to the wireless power transmitter for requesting a change in out-of-band communication. When the out-of-band communication change request signal is received, the wireless power transmitter may release the currently established out-of-band communication link and establish a new out-of-band communication link using an out-of-band communication method requested by the wireless power receiver.

For example, the out-of-band communication method applicable to the present invention may include at least one of Near Field Communication (NFC), Radio Frequency Identification (RFID) communication, Bluetooth Low Energy (BLE) communication, Wideband Code Division Multiple Access (WCDMA) communication, Long Term Evolution (LTE)/LTE-Advance communication, or Wi-Fi communication.

In addition, communication between the wireless power transmitter applicable to the present invention and the home network server and/or the cloud server for power management, communication between the home network server and/or the cloud server for power management and a user terminal, and communication between wireless power transmitters may be performed through any one or a combination of at least one of a wired or wireless IP network, Wideband Code Division Multiple Access (WCDMA) communication, Long Term Evolution (LTE)/LTE-Advanced communication, and Wi-Fi communication, without being limited thereto.

Figure 10:
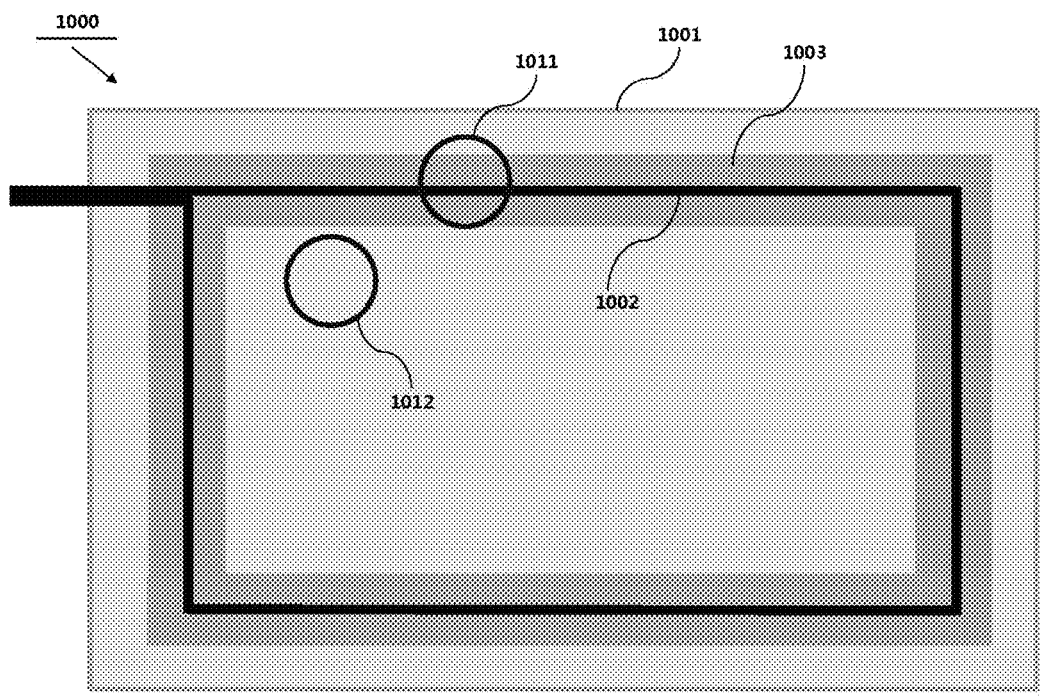
FIG. 10 is a view for explaining a problem in a wireless charging system that supports an electromagnetic resonance scheme according to the related art.

FIG. 10 is a view for explaining a problem in a wireless charging system that supports an electromagnetic resonance scheme according to the related art.

Referring to FIG. 10, a wireless power transmission pad 1000, which transmits power in a conventional electromagnetic resonance scheme, may include a charge bed 1001, on which a wireless power reception device is disposed, the charge bed having a planar shape, and a transmission coil 1002 mounted in a closed-loop form below the charge bed 1001 to transmit an electromagnetic signal.

As illustrated in FIG. 10, when the transmission coil 1002 is formed as a closed loop and mounted below the charge bed 1001, a charging shadow area 1003 in which charging is impossible is present within a predetermined distance inward and outward from the turns of the transmission coil 1002.

Here, the direction of a magnetic flux is reversed between the inside and the outside of the closed-loop transmission coil, and the magnetic flux passing through a reception coil placed on or near the transmission coil turns is canceled, so that the sum of the magnetic fluxes approaches zero. Accordingly, there exists the charging shadow area 1003 (i.e., a deadzone) in which wireless charging is impossible within a predetermined distance inward and outward from the transmission coil turns.

In one example, the area or size of the charging shadow area 1003 may vary according to the intensity of power flowing through the transmission coil.

In another example, the area or size of the charging shadow area 1003 may differ according to the type of the transmission coil mounted in the wireless power transmission device.

In another example, the area or size of the charging shadow area 1003 may be determined differently according to the class of the wireless power transmission device illustrated in the above Table 1.

When most of the transmission coil is located in the charging shadow area 1003, as illustrated by reference numeral 1011, normal charging may not be achieved. On the other hand, as illustrated by reference numeral 1012, when the transmission coil is located in a charging-capable area, charging may be performed normally.

Figure 11:
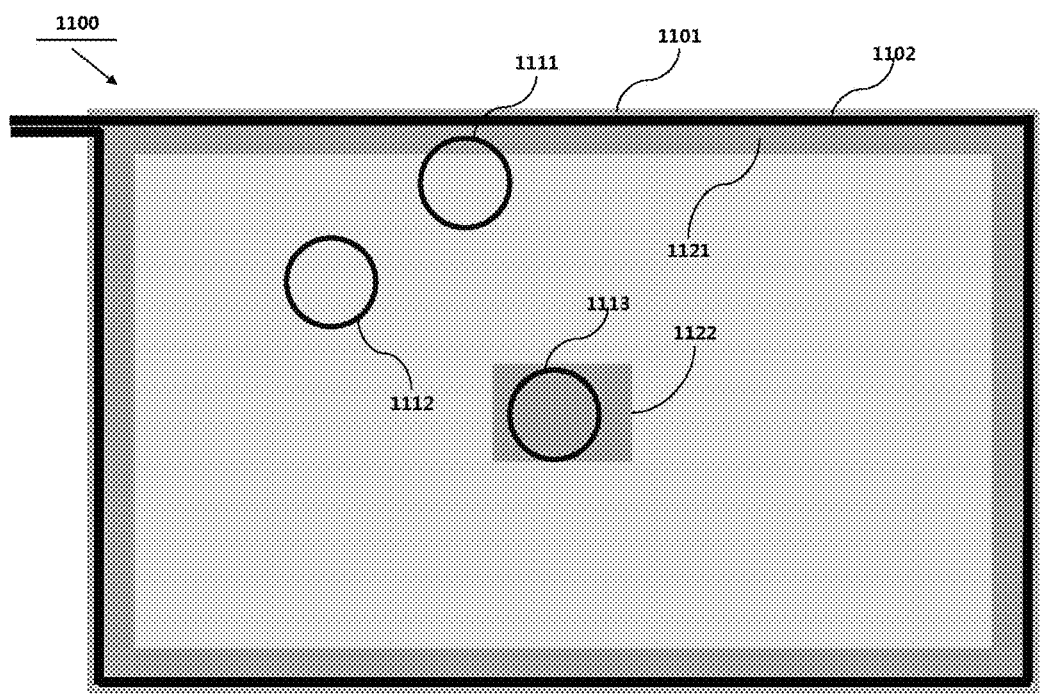
FIG. 11 is a view for explaining a problem in a wireless charging system that supports an electromagnetic resonance scheme according to the related art.

FIG. 11 is a diagram for explaining a problem in a wireless charging system that supports an electromagnetic resonance scheme according to the related art.

Specifically, a conventional wireless power transmission pad 1100 is configured in a manner such that a transmission coil 1102 having a closed loop form is mounted in the edge portion (i.e., the outermost peripheral portion) of a charge bed 1101 in order to minimize the area or size of the charging shadow area 1003 described with reference to FIG. 10.

Referring to FIG. 11, since reception coils, designated by reference numerals 1111 and 1112, are located in a charging-capable area, normal charging may be performed. However, since the transmission coil 1102 is mounted in the outermost peripheral portion of the charge bed, a charging shadow area 1122, in which the magnetic flux of the transmission coil 1102 is insufficient, may be generated in the central portion of the charge bed 1101. In this case, when a reception coil 1113 is located in the charging shadow area 1122 formed in the central portion of the charge bed 1101, as illustrated in FIG. 11, normal charging may not be performed.

When the closed-loop transmission coil 1102 is mounted in the outermost peripheral portion of the charge bed 1101, the length of the turns used in the transmission coil 1102, i.e., the closed-loop area of the transmission coil 1102 may increase, and the area of a shielding material (not illustrated) for preventing electromagnetic signals generated by the transmission coil 1102 from affecting a control circuit (not illustrated) may also increase in proportion to the increased closed-loop area.

Therefore, the method of mounting the closed-loop transmission coil 1102 in the outermost peripheral portion of the charge bed 1101 may not only raise the manufacturing cost of the wireless power transmission device, but also generate an additional charging shadow area 1122 in the central portion of the charge bed 1101.

Figure 12:
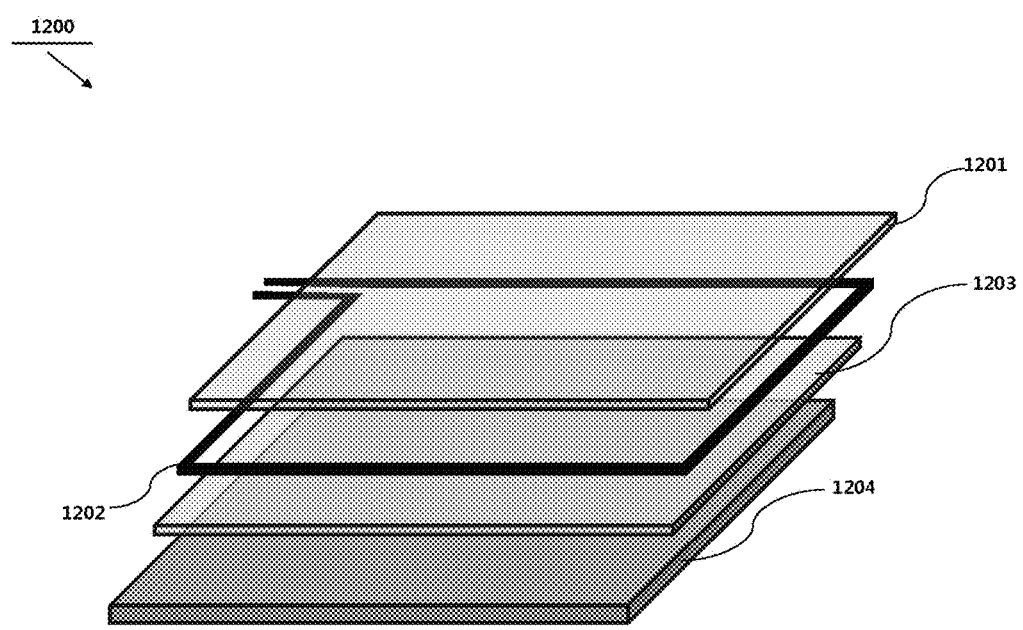
FIG. 12 is a view for explaining the lamination structure of a wireless power transmission pad according to the related art.

FIG. 12 is a view for explaining the lamination structure of a wireless power transmission pad according to the related art.

Referring to FIG. 12, a conventional wireless power transmission pad 1200 is equipped with a transmission coil 1202, having a closed loop form, in the outermost peripheral (edge) portion of a charge bed 1201.

A shielding material 1203 may be mounted below the transmission coil 1202 in order to prevent electromagnetic signals generated from the transmission coil 1202 from being transmitted to a control circuit board 1204. Here, there is a problem in that the area of the shielding material 1203 needs to be larger than the closed-loop area of the transmission coil 1202.

Hereinafter, the configuration of a wireless charging system according to the present invention will be described in detail with reference to FIGS. 13 to 16, in order to overcome the problems of the related art described with reference to FIGS. 10 to 12.

Figure 13:
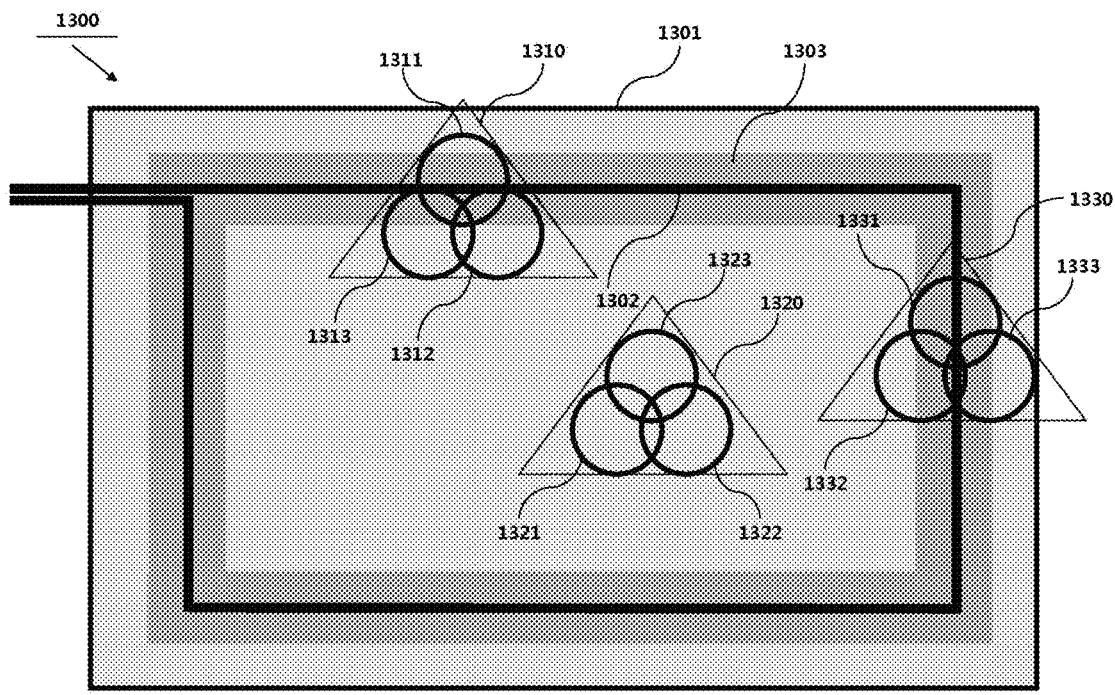
FIG. 13 is a view for explaining the configuration of a wireless charging system according to an embodiment of the present invention.

FIG. 13 is a diagram for explaining the configuration of a wireless charging system according to an embodiment of the present invention.

Referring to FIG. 13, a wireless power transmission pad 1300 according to the present invention may include a charge bed 1301 on which a wireless power reception device is disposed, the charge bed having a planar shape, a transmission coil 1302 mounted in a closed loop form below the charge bed 1301 so as to be spaced apart inward from the outermost peripheral portion of the charge bed 1301, and a shielding material (not illustrated) mounted below the transmission coil 1302 so as to cover an area corresponding to the closed loop. Of course, it is to be noted that a wireless power transmission device according to the present invention may further include a control circuit board (not illustrated) for controlling the operation of the wireless power transmission pad 1300.

The distance by which the closed-loop transmission coil 1302 is spaced apart inward from the edge of the charge bed 1301 may be set to the minimum value at which a charging-capable area formed around the closed loop may be wholly included in the charge bed.

Here, the charging-capable area formed around the closed loop may be determined based on the intensity of the maximum power that may be transmitted via the transmission coil 1302, but this is merely one embodiment, and the charging-capable area formed around the closed loop according to another embodiment of the present invention may be determined based on the thickness of the transmission coil, the number of turns of the transmission coil, the material of the transmission coil, and the like.

In particular, in the present invention, since the closed-loop transmission coil 1302 is spaced apart inward from the edge of the charge bed 1301 by a certain distance, it is possible to prevent an additional charging shadow area from being formed in the central portion of the charge bed 1301.

In addition, in the present invention, since the closed-loop transmission coil 1302 is spaced apart inward from the edge of the charge bed 1301 by a certain distance, it is possible to reduce the cost of the shielding material and the transmission coil.

The area of the shielding material (not illustrated) according to the present invention may be set to be equal to or greater than the internal area of the closed loop and less than the area of the charge bed 1301.

In particular, the wireless power reception device applied to the wireless charging system according to the present invention may be equipped with a multi-reception coil.

In the configuration of the multi-reception coil, the arrangement of reception coils needs to be determined such that the magnetic coupling coefficient between the respective reception coils is zero or as small as possible.

When the value of the magnetic flux coupling coefficient between the reception coils is equal to or greater than a predetermined reference value, the respective reception coils may not operate independently of each other, and therefore, it may be difficult to achieve the object of the present invention, which is to eliminate the deadzone.

For example, it is assumed that one reception coil is located in a charging-capable area and that the other reception coil is located in a non-charging area, i.e., a charging shadow area. When the magnetic flux coupling coefficient between the two reception coils is a meaningful value, the electromotive force obtained from the reception coil located in the charging-capable area may be transmitted to the reception coil located in the non-charging area so as to generate a magnetic flux. In general, charging efficiency is higher when the reception coils receive power independently of each other than when power is received under the influence of the magnetic flux between the reception coils.

Therefore, disposing the reception coils so that the magnetic flux coupling coefficient between the reception coils is close to zero is a very important factor for maximizing charging efficiency. The method of constructing a multi-reception coil according to an embodiment of the present invention will be described below in detail with reference to FIG. 15.

In order to make the magnetic flux coupling coefficient between the reception coils close to zero, the multi-reception coil according to the embodiment of the present invention may be configured such that reception coils partially overlap each other, as illustrated by reference numeral 1310.

In FIG. 13, each of the reception coils constituting the multi-reception coil is illustrated as having a circular shape, but this is merely one embodiment, and the reception coil according to another embodiment of the present invention, as illustrated in FIG. 15, may have a fan shape, and the final shape in which the fan-shaped reception coils are arranged may be a circular shape.

In addition, the multi-reception coil may be configured such that the reception coils mutually form rings.

FIG. 13 illustrates that the multi-reception coil is constituted by three reception coils, but this is merely one embodiment, and the multi-reception coil according to another embodiment of the present invention may include four or more reception coils. Of course, in this case as well, the size of the overlapping region needs to be determined such that the coupling coefficient between any two reception coils, among first to $N^{th}$ reception coils, is zero or has a value equal to or less than a predetermined reference value.

In particular, the first to $N^{th}$ reception coils may be arranged such that the overlapping areas between any two reception coils, among the first to $N^{th}$ reception coils, are the same.

In the case of the multi-reception coil designated by reference numeral 1310, it can be seen that a first reception coil 1311 is located in a charging shadow area and that the remaining second and third reception coils 1312 and 1313 are located in a charging-capable area.

It can also be seen that all reception coils 1321, 1322, and 1323 of a multi-reception coil designated by reference numeral 1320 are located in the charging-capable area.

It can also be seen that, in a multi-reception coil designated by reference numeral 1330, a first reception coil 1331 is located in the charging shadow area, while the remaining second and third reception coils 1332 and 1333 are located in the charging-capable area. In particular, in the case of the third reception coil 1333, it can be seen that wireless charging is possible by utilizing the charging-capable area formed around the closed-loop transmission coil 1302.

Accordingly, when the multi-reception coil constituted by at least three reception coils is placed in the charge bed 1301, since at least one reception coil is located in the charging-capable area, the present invention may prevent wireless charging from being interrupted or failing.

Figure 14:
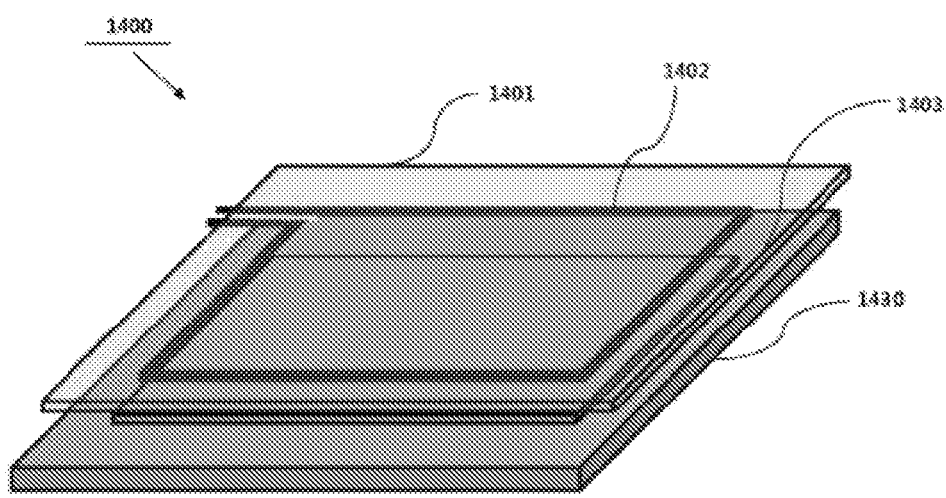
FIG. 14 is a view for explaining the lamination structure of a wireless power transmission device according to an embodiment of the present invention.

FIG. 14 is a view for explaining the lamination structure of a wireless power transmission device according to an embodiment of the present invention.

Referring to FIG. 14, the lamination structure of the wireless power transmission device 1400 may mainly include a charge bed 1401, a transmission coil 1402 mounted in a closed loop form at one side below the charge bed 1402, a shielding material 1403 disposed below the transmission coil 1402 to prevent electromagnetic signals generated by the transmission coil 1402 from being transmitted to a control circuit board 1430, and the control circuit board 1430 disposed below the shielding material 1430. It is a matter of course that both terminals of the transmission coil 1402 need to be electrically connected to the control circuit board 1430.

Examples of the shielding material 1403 may include sintered Ni—Zn ferrite, half-sintered Mn—Zn ferrite, amorphous FeSiB ribbon, Sendust-silicon, and the like.

In another example, the shielding material 1403 may be a polymer composite material (including a film or a coating) with metal-based magnetic powder composed of any one or a combination of two or more of Fe, Ni, Co, Mo, Si, Al, B, and the like.

In another example, the shielding material 1403 may be a polymer composite material (including a film or a coating) with ferrite-based powder composed of a combination of two or more of Fe, Ni, Mn, Zn, Co, Cu, Ca, and the like.

In another example, the shielding material 1403 may be a ferrite-based sintered material composed of a combination of two or more of Fe, Ni, Mn, Zn, Co, Cu, Ca, and the like, or may be half-slitting processed to impart impact resistance.

In another example, the shielding material 1403 may be a ferrite-based sintered material composed of a combination of two or more of Fe, Co, Ba, Sr, Zn, Ti, and Sn.

In another example, the shielding material 1403 may be a polymer composite material with ferrite-based powder composed of a combination of two or more of Fe, Ni, Mn, Zn, Co, Cu, Ca, Li, Ba, Sr, Ti, and Sn.

In a further example, the shielding material 1403 may be permalloy. For example, FeSi, FeNi, FeCo, Ni, or the like may be utilized.

The shielding material 1403 may be configured in the form of a double-sided adhesive sheet or in the form of a Sendust block formed by mixing magnetic metal powder and a synthetic resin.

In particular, the transmission coil 1402 according to the present invention may be spaced apart inward from the edge of the charge bed 1401 by a predetermined distance, and the area of the shielding material 1403 may be equal to or greater than the closed loop area of the transmission coil 1402. That is, the area of the shielding material 1403 may be equal to or greater than the closed loop area of the transmission coil 1402 and less than the area of the charge bed 1401.

Accordingly, the wireless power transmission device 1400 according to the present invention may reduce manufacturing costs since a fewer number of transmission coils and a smaller amount of shielding material are used compared to the conventional method of disposing the closed-loop transmission coil in the outermost peripheral portion of the charge bed. The wireless power transmission device 1400 according to the present invention may effectively prevent a charging shadow area, which is formed in the central portion of the charge bed when the closed-loop transmission coil is disposed in the outermost peripheral portion of the charge bed, as illustrated in FIG. 11.

Figure 15A:
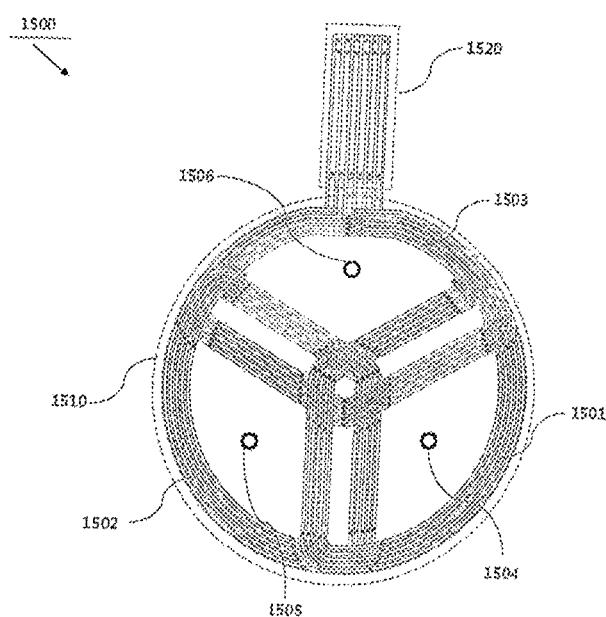
FIGS. 15a and 15b are views for explaining the structure of a multi-reception coil mounted in a wireless power reception device according to an embodiment of the present invention.
Figure 15B:
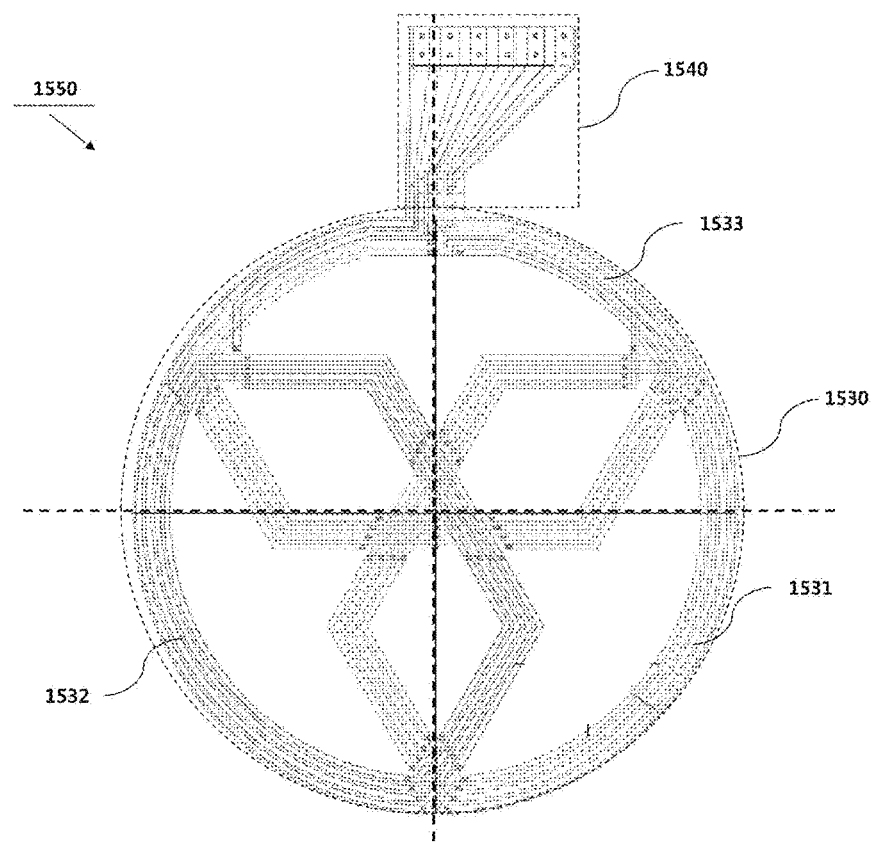

FIGS. 15a and 15b are views for explaining the structure of a multi-reception coil mounted in a wireless power reception device according to an embodiment of the present invention.

Hereinafter, it is to be noted that, although the multi-reception coil 1500 is illustrated as being formed by combining three independent reception coils, this is merely one embodiment, and the multi-reception coil may be configured by combining two reception coils, or four or more.

Referring to FIG. 15a, the multi-reception coil 1500 may include a coil arrangement area 1510 and an output terminal area 1520.

A first reception coil 1501, a second reception coil 1502, and a third reception coil 1503 may be disposed in the coil arrangement area 1510. The first to third reception coils 1501 to 1503 may be arranged so that partial regions thereof overlap each other. Here, the overlapping regions between the reception coils need to be determined such that the magnetic coupling coefficient between the reception coils is zero or has a small value meaning that the reception coils operate independently of each other.

In addition, as illustrated in FIG. 15a, the turns of the first to third reception coils 1501 to 1503 may mutually form rings.

In addition, the first to third reception coils 1501 to 1503 may have a fan shape, and the overall arrangement of the first to third reception coils 1501 to 1503 in the coil arrangement area 1510 may have a circular shape. Here, the interior angle of the fan shape may be 120 degrees, which is obtained by dividing 360 degrees by 3, without being limited thereto. When the multi-reception coil is composed of four reception coils having a fan shape, the interior angle of the fan shape may be 90 degrees, without being limited thereto.

In addition, the first to third reception coils may be disposed such that the turns of the fan-shaped reception coils are parallel to each other in the linear section thereof.

In addition, the number of turns of each of the first to third reception coils 1501 to 1503 may be five, but this is merely one embodiment, and it is to be noted that the number of turns for each reception coil may differ according to the class and configuration of the wireless power transmission device in which the corresponding multi-reception coil is mounted.

When the number of reception coils included in the multi-reception coil is "N", first to $N^{th}$ reception coils may be arranged such that the areas of the overlapping regions between any two reception coils, among the first to $N^{th}$ reception coils, are the same.

Referring to FIG. 15*a*, both ends of each of the first to third reception coils 1501 to 1503 may be coupled to an output terminal provided in the output terminal area 1520. Here, an output terminal corresponding to each reception coil may be connected to a rectifier.

In addition, temperature sensing holes 1504 to 1506 may be provided in one side of each reception coil so that a temperature sensor for temperature measurement may be mounted therein.

The multi-reception coil 1500 may be printed on a printed circuit board, but this is merely one embodiment, and the multi-reception coil 1500 according to another embodiment of the present invention may be formed by attaching a predetermined number of turns of a copper coil to a shielding material or a metal plate, or may be formed by attaching a reception coil, formed by etching a metal plate (e.g., a copper plate), to a shielding material.

FIG. 15*b* illustrates the structure of a multi-reception coil 1550 according to another embodiment.

Referring to FIG. 15*b*, the multi-reception coil 1550 may include a coil arrangement area 1530 and an output terminal area 1540.

A first reception coil 1531, a second reception coil 1532, and a third reception coil 1533 may be disposed in the coil arrangement area 1530. As illustrated in FIG. 15*b*, the first to third reception coils 1531 to 1533 may be disposed such that partial regions thereof overlap each other. Here, the overlapping regions between the reception coils need to be determined such that the magnetic coupling coefficient between the reception coils is zero or has a small value meaning that the reception coils operate independently of each other.

In addition, as illustrated in FIG. 15*b*, the turns of the first to third reception coils 1531 to 1533 may mutually form rings.

The region in which all of the first to third reception coils 1531 to 1533 overlap each other may have a triangular shape, and the overall arrangement shape of the first to third reception coils 1531 to 1533 in the coil arrangement area 1530 may have a circular shape.

Here, it is to be noted that the sum of the areas of the respective reception coils exceeds the circular area.

In this way, it is possible to maximize a power reception area via the respective reception coils. It can be seen that, assuming that the multi-reception coil 1500 of FIG. 15*a* and the multi-reception coil 1550 of FIG. 15*b* have the same circular area, the area of the reception coils constituting the multi-reception coil 1550 of FIG. 15*a* is greater than the area of the reception coils constituting the multi-reception coil 1550 of FIG. 15*a*.

FIG. 15*b* illustrates the arrangement structure of the multi-reception coil 1550 when the number of reception coils is three. When the number of reception coils is three, a crossing angle of two different reception coil turns cross each other (hereinafter referred to as a crossing angle of the reception coils for convenience of explanation) may be 60 degrees, without being limited thereto.

When the number of reception coils included in the multi-reception coil is "N", first to $N^{th}$ reception coils may be arranged such that the areas of the overlapping regions between any two reception coils, among the first to $N^{th}$ reception coils, are the same.

Referring to FIG. 15*b*, both ends of each of the first to third reception coils 1531 to 1533 may be coupled to an output terminal provided in the output terminal area 1540. Here, an output terminal corresponding to each reception coil may be connected to a rectifier.

In addition, temperature sensing holes may be provided in one side of each reception coil so that a temperature sensor for temperature measurement may be mounted therein.

The multi-reception coil 1550 may be printed on a printed circuit board, but this is merely one embodiment, and the multi-reception coil 1500 according to another embodiment of the present invention may be formed by attaching a predetermined number of turns of a copper coil to a shielding material or a metal plate, or may be formed by attaching a reception coil, formed by etching a metal plate (e.g., a copper plate), to a shielding material.

Figure 16:
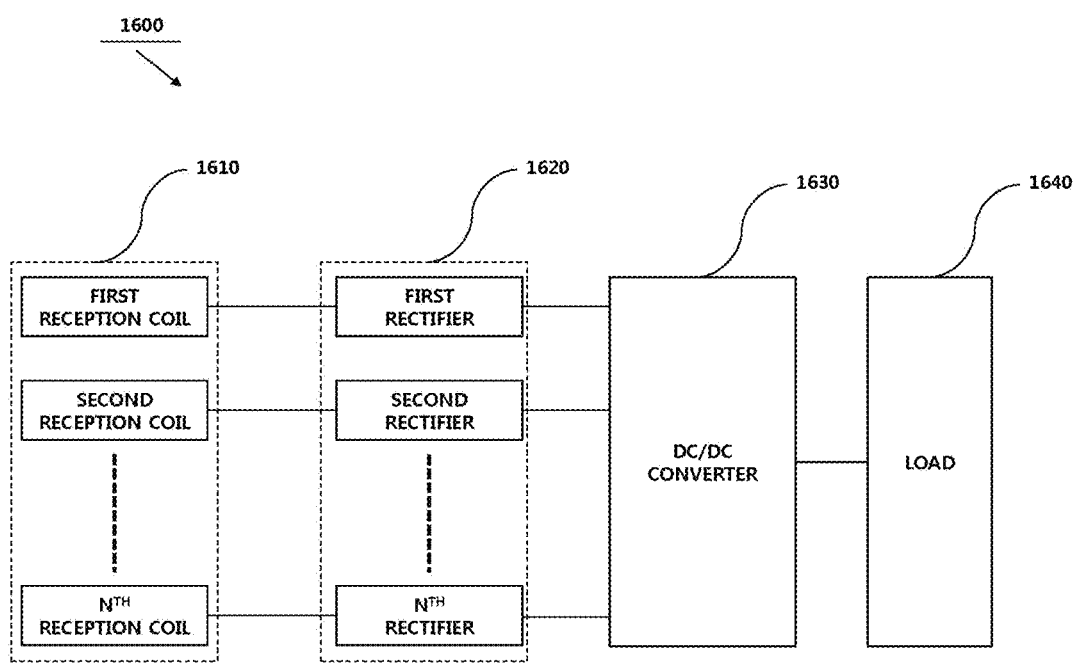
FIG. 16 is a block diagram for explaining the configuration of a wireless power reception device according to an embodiment of the present invention.

FIG. 16 is a block diagram illustrating the configuration of a wireless power reception device according to an embodiment of the present invention.

Referring to FIG. 16, the wireless power reception device 1600 may include a reception unit 1610, a rectification unit 1620, a DC/DC converter 1630, and a load 1640.

The reception unit 1610 may be a multi-reception coil including first to $N^{th}$ reception coils. Here, "N" may have a value of 3 or more.

The output of the reception unit 1610, i.e., AC power, may be transmitted to the rectification unit 1620 and converted to DC power.

The rectification unit 1620 according to the embodiment, as illustrated in FIG. 16, may include the same number of rectifiers as the number of reception coils included in the reception unit 1610.

In another example, a switch (not illustrated) may further be provided between the reception unit 1610 and the rectification unit 1620. In this case, the intensity of AC power received via the reception coils may be measured so that a reception coil capable of receiving power having the intensity equal to or greater than a predetermined reference value is selected, and the AC power corresponding to the selected reception coil may be transmitted to the rectifier. Of course, in this case, it is to be noted that the wireless power reception device may further include power sensor(s) (not illustrated) for measuring the intensity of the AC power for each reception coil and a controller for controlling the switch to select a reception coil, which is to receive power, based on the sensing value of the power sensor and transmit the AC power of the selected reception coil to the rectifier.

In the above embodiment, the intensity of the AC power for selecting a reception coil of the multi-reception coil to be used for charging is measured. However, this is merely one embodiment, and the controller according to another embodiment of the present invention may select a reception coil for charging based on the intensity of the rectifier output power, i.e., DC power, for each reception coil obtained via switch control.

It is to be noted that the wireless power reception device may perform charging via a selected one of the reception coils included in the multi-reception coil, but this is merely one embodiment, and the wireless power reception device according to another example may perform charging using a plurality of reception coils selected from among the reception coils included in the multi-reception coil.

The DC/DC converter 1630 may convert the DC power received from the rectification unit 1620 to specific DC power required by the load 1640.

Figure 17:
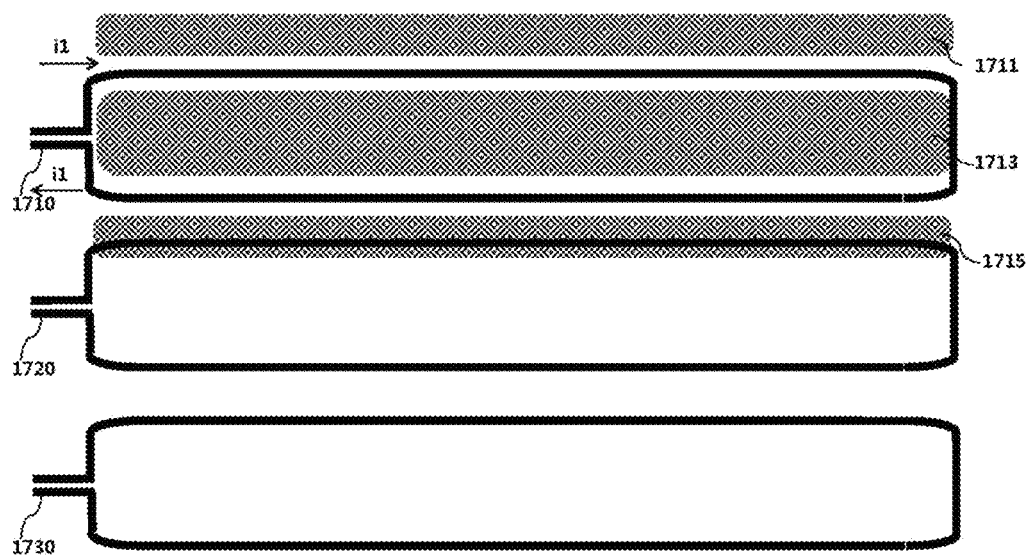
FIGS. 17 to 19 are views illustrating a charging-capable area generated when current is applied to a plurality of transmission coils according to the embodiment.
Figure 18:
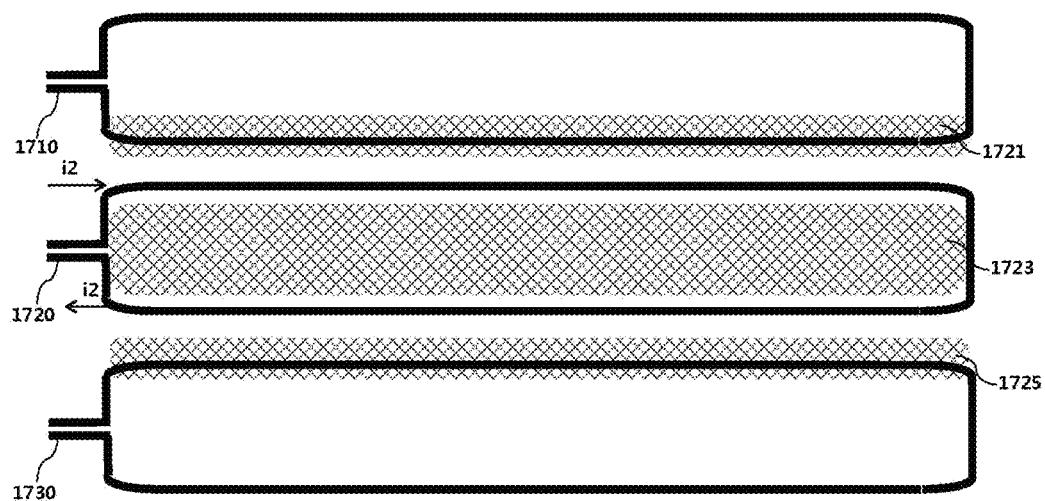
Figure 19:
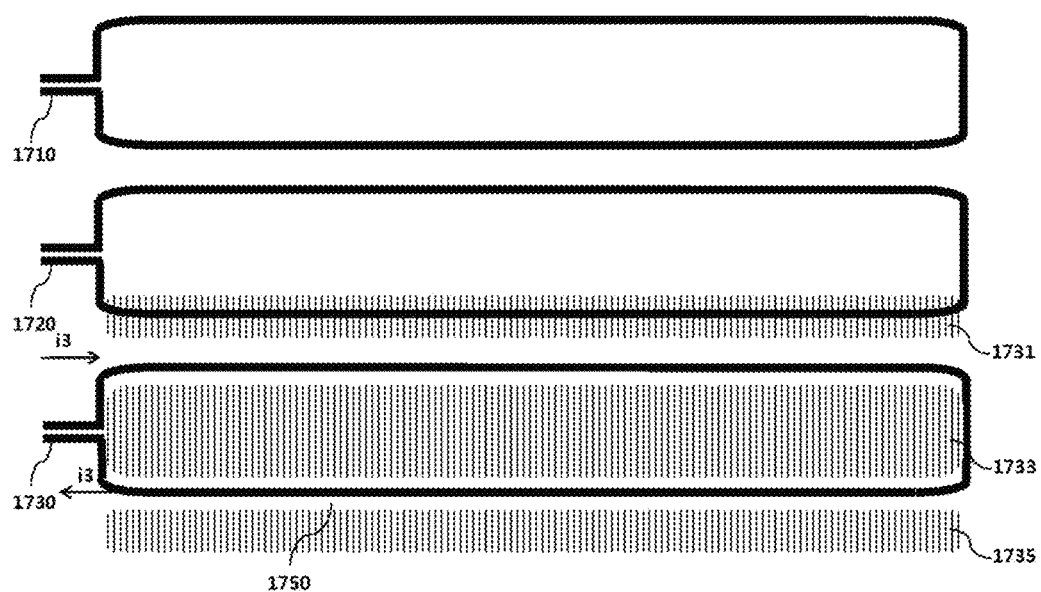

FIGS. 17 to 19 are views illustrating a charging-capable area generated when current is applied to a plurality of transmission coils according to the embodiment.

Referring to FIG. 17, when current i1 is applied to a first transmission coil 1710, a magnetic field is formed in a first area 1711, a second area 1713, and a third area 1715. Thus, charging may be performed when a wireless power receiver is disposed in the corresponding areas 1711, 1713 and 1715. The second area 1713 is an area inside the first transmission coil and corresponds to an inner charging area. The first area 1711 and the third area 1715 correspond to an area outside the first transmission coil 1710.

Here, even if the wireless power receiver is disposed in the area (charging shadow area) in which the first transmission coil 1710 is disposed, charging is not performed. This is because the magnetic flux is canceled and the magnetic flux coupling value becomes 0 or an approximation of 0. Specifically, when the direction of the magnetic field is reversed between the inside and the outside of the first transmission coil 1710 and the reception coil is positioned on the first transmission coil 1710, the magnetic flux generated when the magnetic field formed outside the first transmission coil 1710 passes through the reception coil and the magnetic flux generated when the magnetic field formed inside the first transmission coil 1710 passes through the reception coil offset each other. In particular, when the center of the reception coil is located at the center of the first transmission coil 1710, the magnetic flux is completely canceled and the magnetic flux coupling value becomes zero.

The charging shadow area includes an inner charging shadow area disposed inside the first transmission coil 1710 and an outer charging shadow area disposed outside the first transmission coil 1710. Referring to FIG. 17, a charging shadow area is formed between the second area 1713 and the third area 1715 and between the first area 1711 and the second area 1713. Here, when current is applied to a second transmission coil 1720, the charging shadow area between the second area 1713 and the third area 1715 may be converted into a charging-capable area.

Referring to FIG. 18, when current i2 is applied to the second transmission coil 1720, a magnetic field is formed in a fourth area 1721, a fifth area 1723, and a sixth area 1725. Thus, charging may be performed when a wireless power receiver is disposed in the corresponding areas 1721, 1723 and 1725. Here, charging is not performed even if the wireless power receiver is disposed in the area in which the second transmission coil 1720 is disposed (between the fourth area 1721 and the fifth area 1723 and between the fifth area 1723 and the sixth area 1725). This is because the magnetic flux is canceled and the magnetic flux coupling value becomes 0 or an approximation of 0. The concrete method has been described with reference to FIG. 17, and will not be described here.

Referring to FIG. 19, when current i3 is applied to a third transmission coil 1730, a magnetic field is formed in a seventh area 1731, an eighth area 1733, and a ninth area 1735. Thus, charging may be performed when a wireless power receiver is disposed in the corresponding areas 1731, 1733 and 1735. Here, even if the wireless power receiver is disposed in the area in which the third transmission coil 1730 is disposed, charging is not performed. Similarly, this is because the magnetic flux is canceled and the magnetic flux coupling value becomes 0 or an approximation of 0.

As can be seen from FIGS. 17 to 19, the charging shadow area inevitably generated in the transmission coil may be converted into the charging-capable area by power transmission of adjacent transmission coils.

Figure 20:
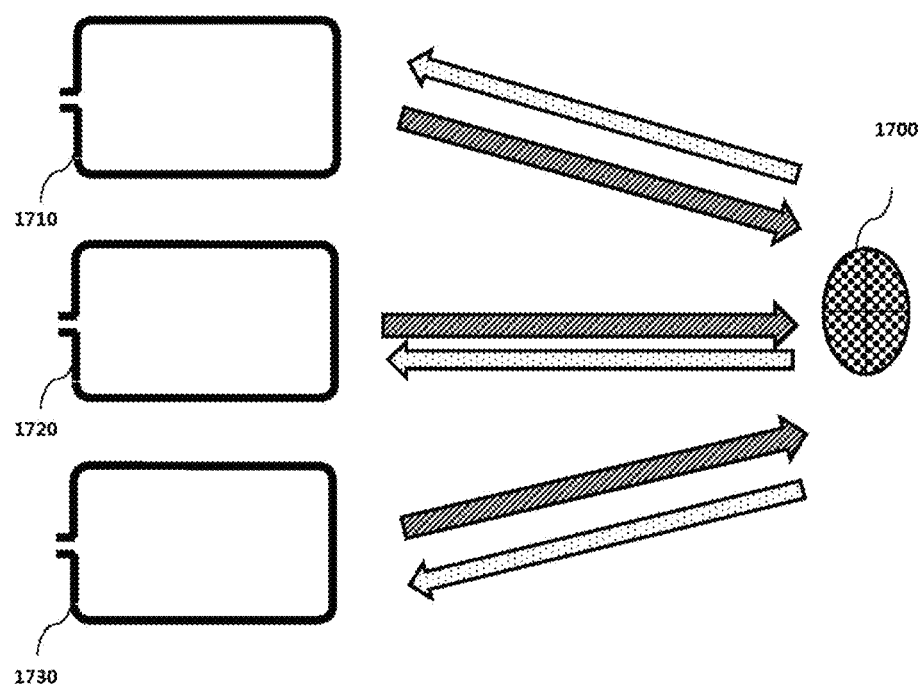
FIG. 20 is a view illustrating a process of transmitting and receiving a sensing signal through an electromagnetic resonance scheme according to the embodiment.

FIG. 20 is a view illustrating a process of transmitting and receiving a sensing signal through an electromagnetic resonance scheme according to the embodiment. The following description will be made with reference to the reference numerals of FIGS. 1e to 7 and 20.

Referring to FIG. 20, the main controller 150 of the transmitter 100 may control a sequence of application of a voltage to the first transmission coil 1710 to the third transmission coil 1730 when wireless power is applied. For example, the main controller 150 may perform control to apply a voltage to the first transmission coil 1710 to the third transmission coil 1730 in a predetermined order or to apply a voltage only to a specific coil.

The main controller 150 may control the first transmission coil 1710 to the third transmission coil 1730 to transmit a short beacon sequence periodically in the power saving state 520. The main controller 150 may detect a change in the impedance of the receiver 1700 via the first transmission coil 1710 to the third transmission coil 1730. This change will be referred to as a short beacon sequence.

Subsequently, the main controller 150 may periodically generate and transmit a long beacon sequence to the receiver 1700 so that the receiver 1700 supplies sufficient power for booting and response in the power saving state 520.

The main controller 150 may transmit wireless power to the receiver 1700 via the first transmission coil 1710 when the receiver 1700 is detected and identified in the first transmission coil 1710.

When the receiver 1700 is detected and identified in the second transmission coil 1720 or the third transmission coil 1730, the main controller 550 may also transmit wireless power via the corresponding transmission coil.

In particular, when the receiver 1700 is simultaneously detected in the first transmission coil 1710 and the second transmission coil 1720 and the receiver 1700 is located in the charging shadow area 1721 (see FIG. 18), the main controller 550 may perform control to transmit wireless power to the receiver 1700 via the second transmission coil 1720.

Figure 21:
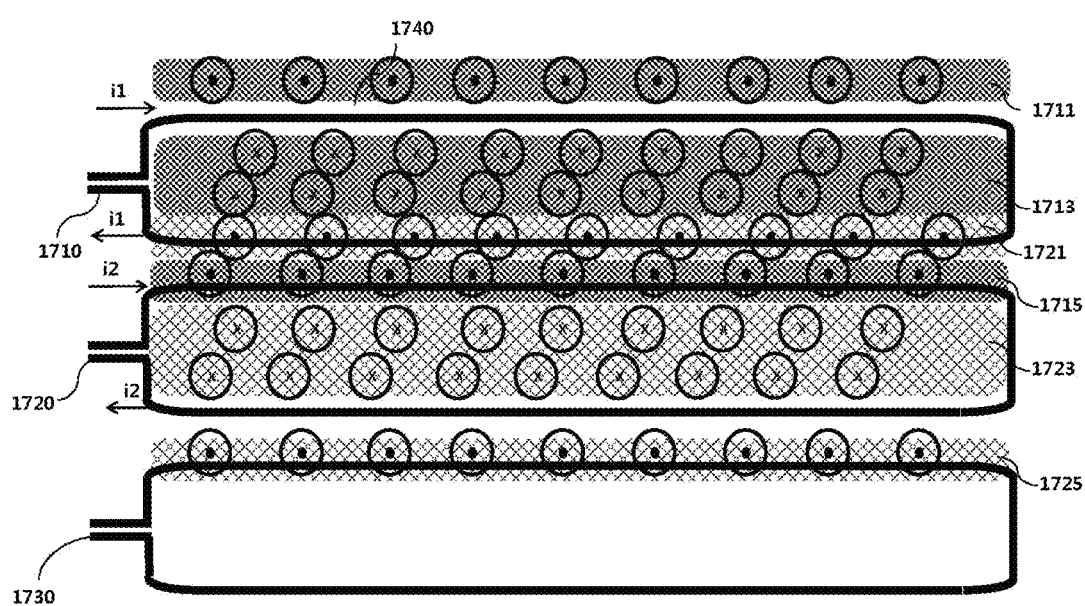
FIG. 21 is a view illustrating the direction of a magnetic field that is generated when current is applied to a plurality of transmission coils according to the embodiment.

FIG. 21 is a view illustrating the direction of a magnetic field that is generated when current is applied to a plurality of transmission coils according to the embodiment.

Referring to FIG. 21, when the current i1 is applied to the first transmission coil 1710 and the current i2 is applied to the second transmission coil 120, an upward magnetic flux may be formed in the first area 1711 and the third area 1715 by the first transmission coil 1710. An upward magnetic flux may also be formed in the fourth area 1721 and the sixth area 1725 by the second transmission coil 1720. In addition, a downward magnetic flux may be formed in the second area 1713 by the first transmission coil 1710 and in the fifth area 1723 by the second transmission coil 1720. The magnetic fluxes of FIG. 21 are an example when the receiver 1700 is not present, and the case in which the directions of the magnetic fluxes are different also falls within the scope of the present invention.

Figure 22:
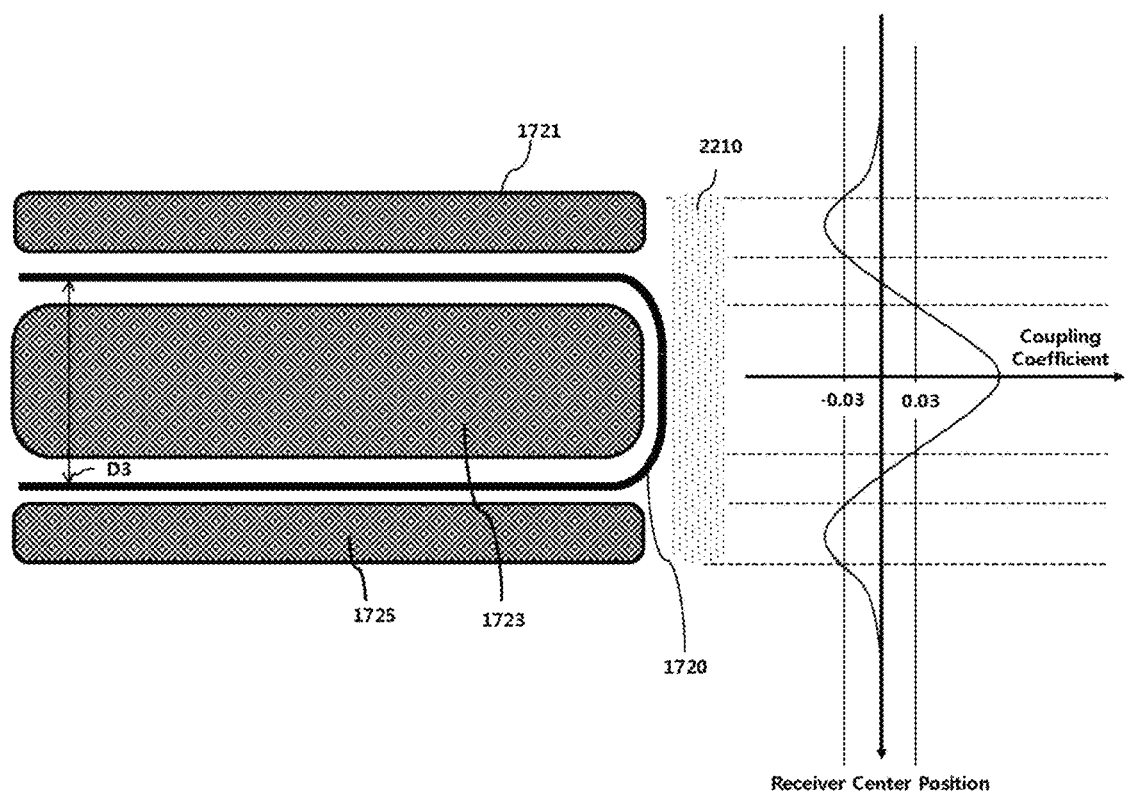
FIG. 22 is a view illustrating the coupling coefficient depending on the position of a wireless power receiver according to the embodiment.

FIG. 22 is a view illustrating the coupling coefficient depending on the position of a wireless power receiver according to the embodiment.

Referring to FIG. 22, a wireless power receiver may be disposed in the fourth area 1721, the fifth area 1723, and the sixth area 1725. The wireless power receiver may be located in a tenth area 2210, but this will not be discussed in detail here. In addition, although the diameter of the wireless power receiver may be greater than the width D3 of the second transmission coil 1720, in the following description, it is assumed that the diameter of the receiver is less than the width of the second transmission coil 1720. In addition, when the absolute value of the coupling coefficient is 0.03 or less, the second transmission coil 1720 may have transmission efficiency of about 10%. In this specification, it is assumed that charging is possible when the absolute value of the coupling coefficient is 0.03 or more. When the transmission efficiency is set differently, the absolute value of the coupling coefficient may also be changed. For example, when the transmission efficiency is set to 7%, charging may be performed even when the absolute value of the coupling coefficient is greater than 0.03. However, the absolute value of the coupling coefficient may be variously changed depending on the thickness, position, and shape of the transmitter coil, and the thickness, position, and shape of the receiver coil.

The area in which the absolute value of the coupling coefficient is greater than 0.03 corresponds to the fourth area 121, the fifth area 1723, and the sixth area 1726. Charging may be performed normally in these areas. However, in the area in which the second transmission coil 1720 is disposed, the absolute value of the coupling coefficient is equal to or less 0.03, which makes charging impossible.

Figure 23:
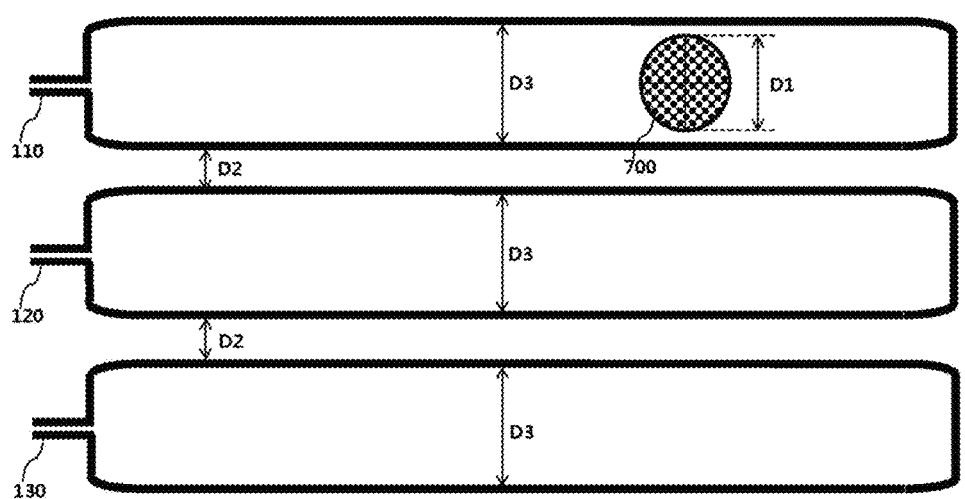
FIG. 23 is a view illustrating the distance between a plurality of transmission coils according to the embodiment.

FIG. 23 is a view illustrating the distance between a plurality of transmission coils according to the embodiment.

It is assumed that the receiver 1700 has a diameter D1, and that the first to third transmission coils 1710, 1720 and 1730 have a width D3 and a distance D2 therebetween. It is also assumed that D2 is (½)*D1. In addition, an upper portion in which the first transmission coil 1710 is located (a midpoint between the first area and the second area, an outer portion outside the first transmission coil, and an inner portion inside the first transmission coil) and a lower portion in which the third transmission coil 1730 is located (a midpoint between the eighth area and the ninth area) are assumed to have a width of (⅓)*D1.

Here, considering the second transmission coil 1720 by way of example, the point having the greatest coupling coefficient due to the coil between the fourth area and the fifth area may be a point (inside the transmission coil) at a distance of (½)*D1 from the coil between the fourth area and the fifth area, and the point having the greatest coupling coefficient due to the coil between the fifth area and the sixth area may be a point (inside the transmission coil) at a distance of (½)*D1 from the coil between the fifth area and the sixth area. However, the coupling coefficient becomes the greatest at the center point of the diameter D3 when calculated as an average.

As a result, a charging-capable area width may be 3*D3+2*D2−(⅓)*2*D1. The distance D2 may be changed by finding the point having the best magnetic flux coupling between the plurality of transmission coils 1710 to 1730, and may be changed according to the thickness of the transmission coil and the size of the receiver 1700.

Figure 24:
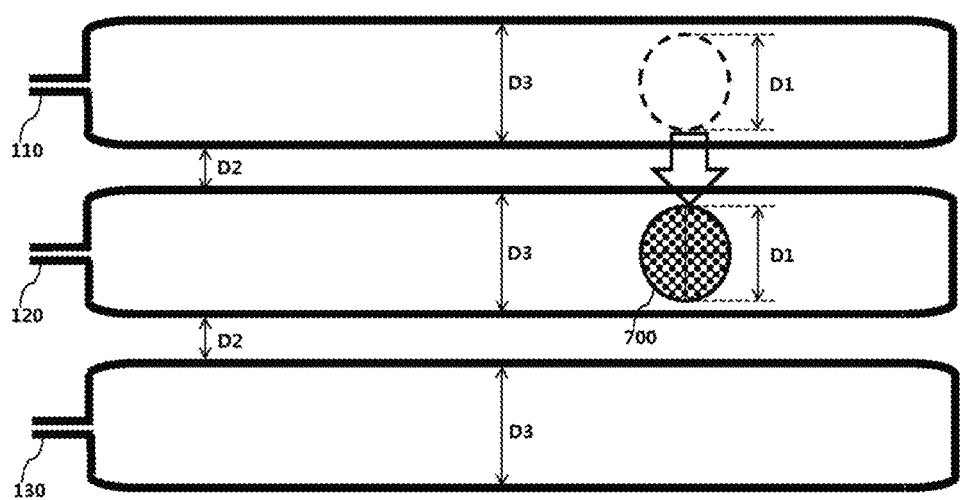
FIGS. 24 to 26 are views for explaining wireless power transmission when a receiver is moved on a transmitter according to the embodiment.

Hereinafter, an embodiment in which the receiver moves on the transmitter will be described with reference to FIGS. 24 to 26.

In the following description, the receiver 1700 is assumed to be a wireless mouse, and the transmitter is assumed to be a wireless mouse pad.

First, in the case of FIG. 14, the first transmission coil 1710 detects and identifies the receiver 1700. Here, the main controller 150 may transmit wireless power to the receiver 1700 via the first transmission coil 1710.

Next, when the receiver 1700 moves into the second transmission coil 1720, and when the main controller 150 detects and identifies the receiver 1700 using the second transmission coil 1720, the power of the first transmission coil 1710 may be cut off. That is, when the receiver 1700 enters a certain area of the second transmission coil 1720, the power of the first transmission coil 1710 may be cut off and wireless power may be transmitted to the receiver 1700 via the second transmission coil 1720.

When the receiver 1700 moves from the area of the second transmission coil 1720 to enter the area of the third transmission coil 1730, the power of the second transmission coil 1720 may be cut off and power may be supplied to the third transmission coil 1730.

Figure 25:
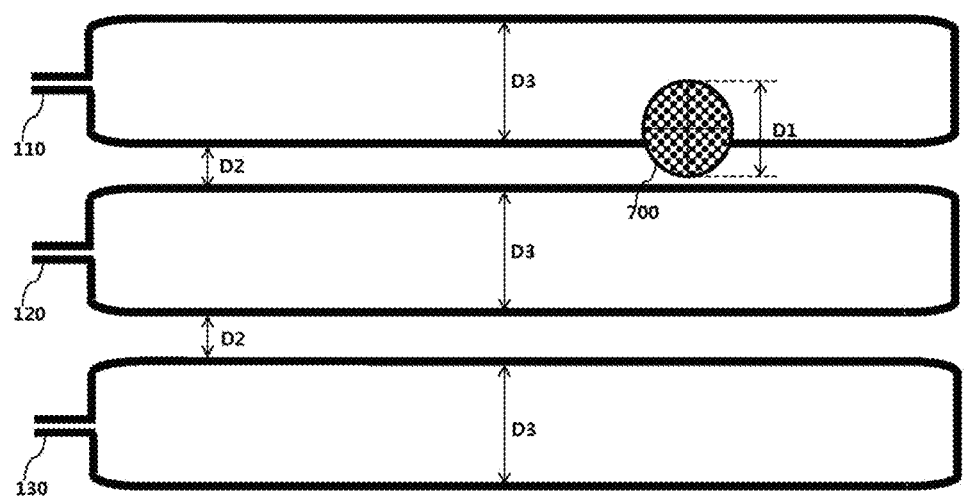

When the receiver 1700 is disposed as illustrated in FIG. 25, the main controller 150 may detect and identify the receiver 1700 via the first transmission coil 1710 and the second transmission coil 1720. Since the area in which the receiver 1700 is disposed is a shadow area of the first transmission coil 1710, the main controller 150 may cut off the power of the first transmission coil 1710 and may transmit a wireless signal to the receiver 1700 via the second transmission coil 1720. In conclusion, according to the present invention, seamless wireless power transmission/reception is possible even if the receiver 1700 moves on the transmitter. Referring to FIGS. 17 to 19, when wireless power is transmitted from the first transmission coil 1710 to the receiver 1700 in the second area 1713 and the receiver 1700 moves to the fourth area 1721, the controller 150 may cut off the power of the first transmission coil 1710, and may transmit wireless power via the second transmission coil 1720 or may transmit wireless power via both the first transmission coil 1710 and the second transmission coil 1720. Then, when the receiver 1700 moves to the third area 1715, wireless power may be transmitted via the first transmission coil 1710, or may be simultaneously transmitted via the first transmission coil 1710 and the second transmission coil 1720. Then, in the fifth area 1723, the main controller 150 may transmit wireless power to the receiver 1700 only via the second transmission coil 1720.

Figure 26:
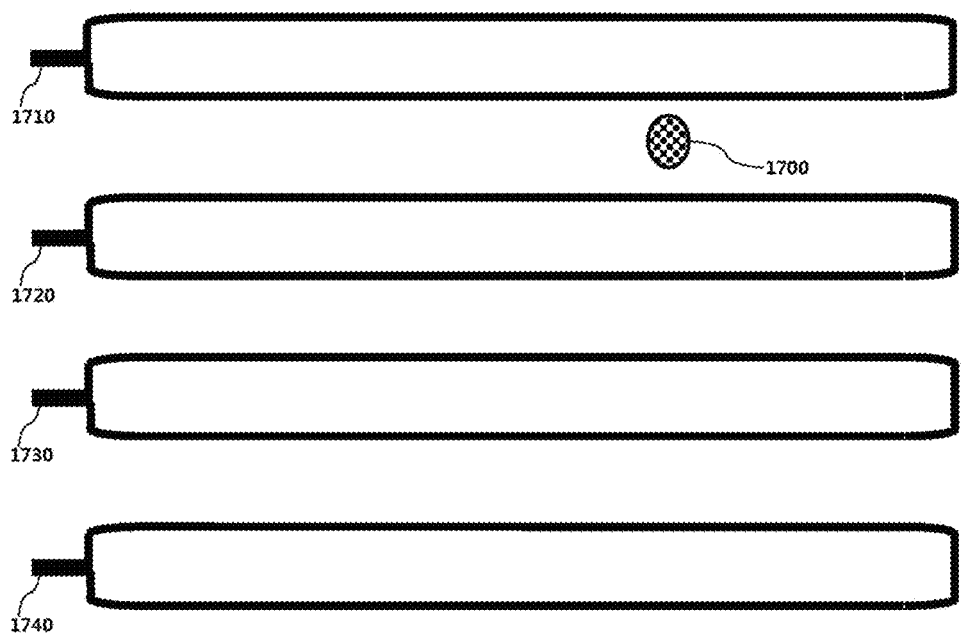

As illustrated in FIG. 26, when the receiver 1700 is detected and identified from the first transmission coil 1710 and the second transmission coil 1720, the main controller 150 may control both the first transmission coil 1710 and the second transmission coil 1720 to transmit wireless power to the receiver 1700.

However, the case in which automatic wireless power transmission is realized falls within the scope of the present invention as long as a receiver is detected and identified via a transmission coil.

Meanwhile, the electromagnetic resonance scheme is presumed in this specification, but the present invention may also be implemented through a magnetic induction scheme.

The method according to embodiments of the present disclosure may be implemented as a program to be executed on a computer and stored in a computer-readable recording medium. Examples of the computer-readable recording medium include ROM, RAM, CD-ROM, magnetic tapes, floppy disks, and optical data storage devices, and also include carrier-wave type implementation (e.g., transmission over the Internet).

The computer-readable recording medium may be distributed to a computer system connected over a network, and computer-readable code may be stored and executed thereon in a distributed manner. Functional programs, code, and code segments for implementing the method described above may be easily inferred by programmers in the art to which the embodiments pertain.

It is apparent to those skilled in the art that the present disclosure may be embodied in specific forms other than those set forth herein without departing from the spirit and essential characteristics of the present disclosure.

Therefore, the above embodiments should be construed in all aspects as illustrative and not restrictive. The scope of the disclosure should be determined by the appended claims and their legal equivalents, and all changes coming within the meaning and equivalency range of the appended claims are intended to be embraced therein.

INDUSTRIAL APPLICABILITY

The present invention is applicable to a wireless charging field, and more particularly to a wireless power reception device and a wireless power transmission device.

The invention claimed is:

1. A wireless power reception device comprising:
first to $N^{th}$ reception coils disposed such that partial regions thereof overlap each other for receiving a wireless power signal;
first to $N^{th}$ output terminals connected to both ends of each of the first to $N^{th}$ reception coils for transferring alternating current power induced by at least one of the first to $N^{th}$ reception coils; and
a rectifier configured to convert the alternating current power, input from the first to $N^{th}$ output terminals, into direct current power,
wherein each of the first to $N^{th}$ reception coils has a fan shape,
wherein each fan shaped coil among the first to $N^{th}$ reception coils overlaps with at least two other fan shaped coils among the first to $N^{th}$ reception coils, and the first to $N^{th}$ reception coils overlap to form a single circle shape,
wherein an area of each of the first to $N^{th}$ reception coils exceeds ⅓ of an area inside the single circle shape, and
wherein the area of a corresponding coil among the first to Nth reception coils includes an outer region occupied by one or more turns of the corresponding coil and an inner region surrounded by the one or more turns of the corresponding coil.

2. The device according to claim 1, wherein each overlapping region has a size determined such that a coupling coefficient between any two reception coils, among the first to $N^{th}$ reception coils, is zero or a value equal to or less than a predetermined reference value.

3. The device according to claim 1, wherein an interior angle of the fan shape has a value obtained by dividing 360 degrees by N.

4. The device according to claim 1, wherein the first to $N^{th}$ reception coils are disposed such that each coil among the first to $N^{th}$ reception coils has at least one parallel section with at least one other coil among the first to $N^{th}$ reception coils.

5. The device according to claim 1, wherein "N" is equal to or greater than 3.

6. The device according to claim 1, wherein the first to $N^{th}$ reception coils are disposed such that areas of overlapping regions between any two reception coils, among the first to $N^{th}$ reception coils, are the same.

7. The device according to claim 1, wherein the rectifier is provided for each output terminal.

8. The device according to claim 1, wherein the wireless power signal is an alternating current power signal modulated with a predetermined resonance frequency and received wirelessly.

9. The device according to claim 1, further comprising a temperature sensor for measuring a temperature at one side inside a turn of at least one of the first to $N^{th}$ reception coils.

10. The device according to claim 1, wherein a crossing angle between any two reception coils, among the first to $N^{th}$ reception coils, is 60 degrees, where "N" is 3.

11. The device according to claim 1, wherein the first to $N^{th}$ reception coils partially overlap each other, and a region in which all of the first to $N^{th}$ reception coils overlap each other has a triangular shape.

12. The device according to claim 11, wherein the triangular shape and the single circle shape have a same center point.

13. The device according to claim 1, wherein each fan shaped coil among the first to $N^{th}$ reception coils includes two straight outer edges and one curved outer edge.

14. The device according to claim 1, wherein each fan shaped coil among the first to $N^{th}$ reception coils includes three straight outer edges and one curved outer edge.

15. The device according to claim 1, wherein the first to $N^{th}$ reception coils overlap to form three pentagons inside the single circle shape.

16. A wireless power reception device comprising:
first to $N^{th}$ reception coils disposed such that partial regions thereof overlap each other for receiving a wireless power signal;
first to $N^{th}$ output terminals connected to both ends of each of the first to $N^{th}$ reception coils for transferring alternating current power induced by at least one of the first to $N^{th}$ reception coils; and
a rectifier configured to convert the alternating current power, input from the first to $N^{th}$ output terminals, into direct current power,
wherein each of the first to $N^{th}$ reception coils has a fan shape,
wherein each fan shaped coil among the first to $N^{th}$ reception coils overlaps with at least two other fan shaped coils among the first to $N^{th}$ reception coils, and the first to $N^{th}$ reception coils overlap to form a single circle shape, and
wherein the first to $N^{th}$ reception coils partially overlap each other, and a region in which all of the first to $N^{th}$ reception coils overlap each other has a triangular shape.

17. A wireless power reception device comprising:
first to $N^{th}$ reception coils disposed such that partial regions thereof overlap each other for receiving a wireless power signal;
first to $N^{th}$ output terminals connected to both ends of each of the first to $N^{th}$ reception coils for transferring alternating current power induced by at least one of the first to $N^{th}$ reception coils; and
a rectifier configured to convert the alternating current power, input from the first to $N^{th}$ output terminals, into direct current power,
wherein each of the first to $N^{th}$ reception coils has a fan shape,
wherein each fan shaped coil among the first to $N^{th}$ reception coils overlaps with at least two other fan shaped coils among the first to $N^{th}$ reception coils, and the first to $N^{th}$ reception coils overlap to form a single circle shape, and wherein each fan shaped coil among the first to $N^{th}$ reception coils includes three straight outer edges and one curved outer edge.

\* \* \* \* \*